(12) United States Patent
Emmert

(10) Patent No.: US 11,886,622 B2
(45) Date of Patent: Jan. 30, 2024

(54) SYSTEMS AND METHODS FOR ASYNCHRONOUS PROGRAMMABLE GATE ARRAY DEVICES

(71) Applicant: University of Cincinnati, Cincinnati, OH (US)

(72) Inventor: John M. Emmert, Dayton, OH (US)

(73) Assignee: University of Cincinnati, Cincinnati, OH (US)

( * ) Notice: Subject to any disclaimer, the term of this patent is extended or adjusted under 35 U.S.C. 154(b) by 81 days.

(21) Appl. No.: 17/612,727

(22) PCT Filed: May 20, 2020

(86) PCT No.: PCT/US2020/033681
§ 371 (c)(1),
(2) Date: Nov. 19, 2021

(87) PCT Pub. No.: WO2020/242844
PCT Pub. Date: Dec. 3, 2020

(65) Prior Publication Data
US 2022/0237332 A1  Jul. 28, 2022

Related U.S. Application Data

(60) Provisional application No. 62/852,426, filed on May 24, 2019.

(51) Int. Cl.
*G06F 21/75* (2013.01)
*G06F 21/74* (2013.01)
*G06F 21/76* (2013.01)
*H03K 19/0944* (2006.01)

(52) U.S. Cl.
CPC ............ *G06F 21/755* (2017.08); *G06F 21/74* (2013.01); *G06F 21/76* (2013.01); *H03K 19/0944* (2013.01)

(58) Field of Classification Search
CPC ......... G06F 21/755; G06F 21/76; G06F 21/74
See application file for complete search history.

(56) References Cited

U.S. PATENT DOCUMENTS

| | | | | |
|---|---|---|---|---|
| 6,313,660 | B1 * | 11/2001 | Sobelman | H03K 19/1735 326/35 |
| 8,601,414 | B2 * | 12/2013 | Andraus | G06F 30/30 703/2 |
| 8,601,417 | B2 * | 12/2013 | Gowda | G06F 30/327 716/101 |
| 9,123,425 | B2 * | 9/2015 | Dong | H10B 43/35 |
| 9,240,238 | B2 * | 1/2016 | Raghu | G11C 16/10 |

(Continued)

OTHER PUBLICATIONS

International Search Report dated Aug. 28, 2020 in reference to co-pending PCT Application No. PCT/US2020/033681 filed May 20, 2020.

(Continued)

*Primary Examiner* — Viral S Lakhia
(74) *Attorney, Agent, or Firm* — Dinsmore & Shohl LLP

(57) ABSTRACT

Systems and methods of use and fabrication are described for a THx2 threshold gate cell for a programmable gate array including a mode-independent PMOS configuration and an NMOS configuration configured to operate in one of a TH12 mode and a TH22 mode, wherein x is set to a threshold of 1 for the TH12 mode and x is set to a threshold of 2 for the TH22 mode.

16 Claims, 17 Drawing Sheets

(56) References Cited

U.S. PATENT DOCUMENTS

| | | | |
|---|---|---|---|
| 9,275,731 B1* | 3/2016 | Sutardja | G06F 13/00 |
| 9,406,374 B1* | 8/2016 | Singh | G11C 11/418 |
| 9,628,081 B2* | 4/2017 | Jain | H03K 19/17736 |
| 9,696,772 B2* | 7/2017 | Van Winkelhoff | G11C 7/24 |
| 10,009,360 B1* | 6/2018 | Todd | H04L 63/145 |
| 10,482,931 B1* | 11/2019 | Miyatake | G11C 7/12 |
| 10,734,070 B2* | 8/2020 | Yang | G11C 16/32 |
| 2011/0167279 A1* | 7/2011 | Danger | G06F 7/00 713/193 |
| 2014/0167837 A1* | 6/2014 | Yannette | G09C 1/00 327/534 |
| 2017/0169220 A1* | 6/2017 | Fish | H03K 19/17768 |
| 2018/0007074 A1* | 1/2018 | Kune | H04Q 9/00 |
| 2019/0268361 A1* | 8/2019 | Blewett | H04L 63/1425 |
| 2019/0318091 A1* | 10/2019 | Gupta | G06F 21/566 |
| 2020/0151324 A1* | 5/2020 | Walker | G06F 21/6218 |
| 2020/0326373 A1* | 10/2020 | Dickens | G01R 31/318519 |

OTHER PUBLICATIONS

Written Opinion dated Aug. 28, 2020 in reference to co-pending PCT Application No. PCT/US2020/033681 filed May 20, 2020.
Emmert, J.M, et al., "An Asynchronous MPGA THx2 Cell and Architecture for Mitigating Side-Channel Attacks", National Aerospace and Electronics Conference (NAECON), pp. 15-19, Jul. 2019.
EP Extended European Search Report dated May 19, 2023 pertaining to EP application No. 20815609.1 filed Nov. 18, 2021, pp. 1-8.
Yu, J. et al. "A Dual-Rail LUT for Reconfigurable Logic using Null Convention Logic" GLSVLSI'14, ACM, 2014, pp. 261-266.

\* cited by examiner

US 11,886,622 B2

1

SYSTEMS AND METHODS FOR ASYNCHRONOUS PROGRAMMABLE GATE ARRAY DEVICES

CROSS-REFERENCE TO RELATED APPLICATIONS

This application is a National Stage Entry under 35 U.S.C. § 371 of International Patent Application No. PCT/US2020/033681, filed May 20, 2020, which claims the benefit of U.S. Provisional Application Ser. No. 62/852,426 (CIN 0311 MA), filed May 24, 2019, entitled "Asynchronous Programmable Gate Array THx2 Cell," the entireties of which are incorporated by reference herein.

TECHNICAL FIELD

This present disclosure relates to integrated circuit devices and, more particularly, to a THx2 threshold gate cell for an asynchronous programmable gate array and associated cell architecture for mitigating side-channel attacks.

BACKGROUND

Semiconductor chip technology is a basis for integrated circuit devices. Semiconductor manufacturers continually attempt to improve fabrication technologies to attempt to increase an amount of logic on a semiconductor wafer while reducing chip cost and power consumption. However, such chips may be subject to side-channel attacks through an addition of a Trojan circuit during the fabrication process. Such side-channel attacks may use the Trojan circuit in a malicious manner to leak secret or private information during regular chip operation to an undesired party. A need exists for alternative devices that are cost-effective to manufacture and minimize peak and average power consumption while mitigating against side-channel attacks through such Trojan circuits.

BRIEF SUMMARY

According to the subject matter of the present disclosure, a THx2 threshold gate cell may include a mode-independent PMOS configuration, and an NMOS configuration configured to operate in one of a TH12 mode and a TH22 mode, wherein x is a threshold of 1 for the TH12 mode and x is a threshold of 2 for the TH22 mode.

In accordance with one embodiment of the present disclosure, a method of operating a THx2 threshold gate cell may include accessing the THx2 threshold gate cell comprising a mode-independent PMOS configuration and an NMOS configuration configured to operate in one of a TH12 mode and a TH22 mode, setting x to a threshold of 1 to operate in the TH12 mode, and setting x to a threshold of 2 to operate in the TH22 mode.

These and additional features provided by the embodiments described herein will be more fully understood in view of the following detailed description, in conjunction with the drawings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
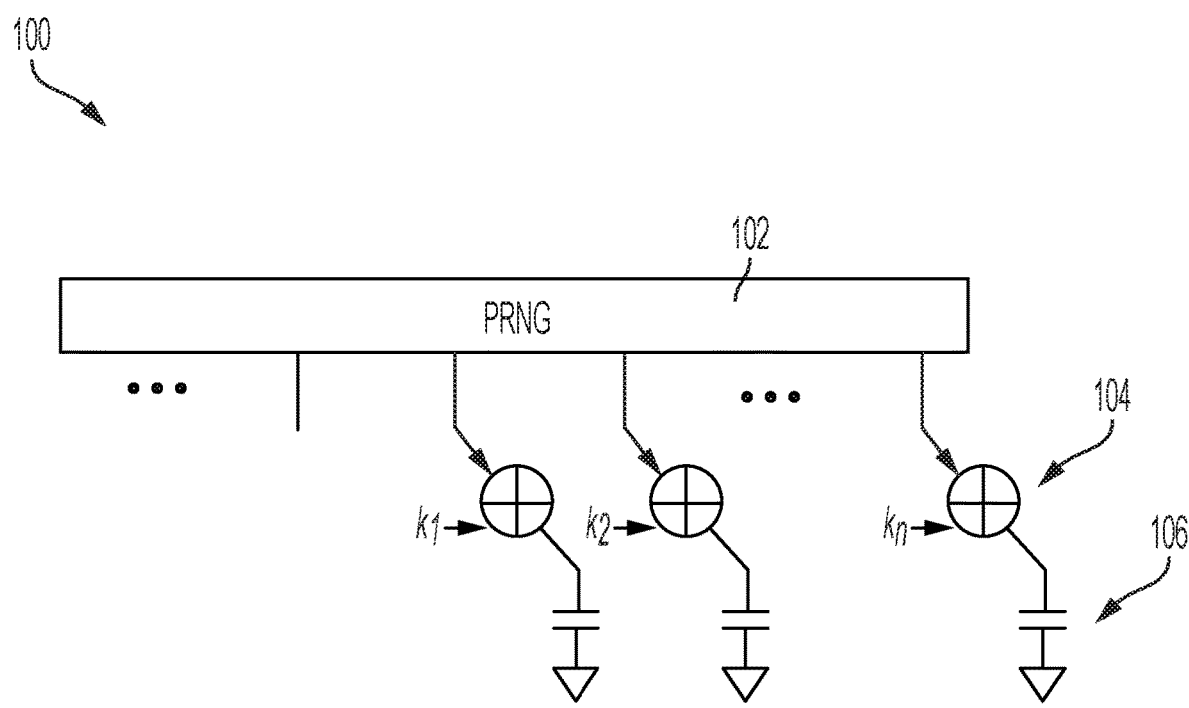
FIG. 1 is a schematic illustration of a Trojan circuit, according to one or more embodiments as shown and described herein.

The embodiments described herein are directed to the design, fabrication, testing, and methods of use for a THx2 threshold gate cell and associated cell architecture for mitigating side-channel attacks, such as through a Trojan circuit 100 of FIG. 1. The THx2 threshold gate cell described in embodiments herein is directed to a programmable gate array (PGA) cell that forms a complete set of asynchronous logic while using transistor device properties to minimize area and provide a high-density architecture for asynchronous circuit design. Systems and methods of use and fabrication are described for a THx2 threshold gate cell for a PGA including a mode-independent PMOS configuration and an NMOS configuration configured to operate in one of a TH12 mode and a TH22 mode based on x being set to a threshold of 1 for the TH12 mode and x being set to a threshold of 2 for the TH22 mode. Thus, a single PGA THx2 threshold cell as described herein can implement either TH12 or TH22 threshold gates to form a complete set of asynchronous logic. As a non-limiting example, the mode-independent PMOS configuration and the NMOS configuration may be configured to collectively form a NAND gate. Implementation of embodiments of a highly compact THx2 cell as described herein can be used to form types of PGA architectures including Mask Programmable Gate Array (MPGA) and Field Programmable Gate Array (FPGA).

To mitigate side-channel attacks, the embodiments described herein are directed to MPGA or a FPGA based on a THx2 threshold cell. The THx2 cell described herein is suitable for metal-oxide-semiconductor field-effect transistor (MOSFET) or fin field-effect transistor (FinFET) implementation, is operative to mitigate against Trojan circuit attacks, and can take advantage of split manufacturing as an added safeguard against tampering through such attacks.

FIGS. 3-9 are directed to a THx2 mask programmable gate array (MPGA) base cell including TH12 and TH22 modes, as described in greater detail below. Having a compact topology and layout, the THx2 cell described herein is configured to enable two-dimensional (2D) arraying similar to that of static read-only-memory (SRAM) memory cells while providing extremely dense THx2 architectures suitable for MPGA structures. Such dense THx2 MPGA architectures make use of MPGA advantages such as fast data through-put rates compared to FPGAs and shortened circuit fabrication times compared to Application Specific Integrated Circuits (ASICs), maximize asynchronous logic per area, and provide asynchronous FPGA designs to mitigate side-channel attacks.

FIGS. 10-15 are directed to a THx2 field programmable gate array (FPGA) cell including a memory cell and a base cell for the TH12 and TH22 modes, as described in greater detail further below. FPGAs are ICs that can be further configured through programming after manufacture through an array of programmable logic blocks and hierarchy of reconfigurable interconnects, and FPGA configuration may be specified and programmed through hardware description language (HDL). The embodiments are FIGS. 10-15 are directed to a minimized, symmetric sixteen (16) transistor design and described herein and in greater detail below including eight (8) NMOS and eight (8) PMOS transistors. Such a design is representative of a programmable FPGA version of THx2 cell. In a non-limiting embodiment, the THx2 FPGA cell includes a highly compact eight (8) transistor THx2 base cell, a five (5) transistor memory cell for programming, and three (3) transistors to enable and control swapping between TH12 and TH22 modes of operation. Such a complete asynchronous FPGA cell implementation is configured to provide highly dense asynchronous FPGA architectures that maximize programmable asynchronous logic per area and provide asynchronous FPGA designs to mitigate side-channel attacks. It is to be understand that other memory cell embodiments and FPGA architectures including different amounts and types of transistors are within the scope of this disclosure as well.

Figure 2:
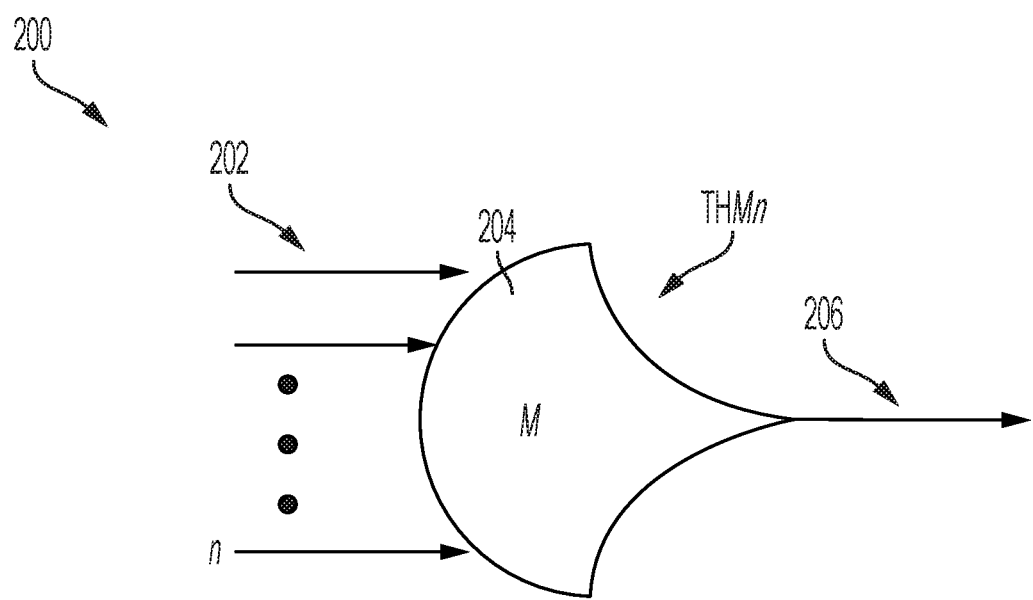
FIG. 2 is an illustration of an example THMn threshold gate symbol including n inputs and a threshold M, according to one or more embodiments as shown and described herein.

I. FIGS. 1-2: Trojan Circuits and Threshold Gates

Referring again to FIG. 1, such Trojan circuits 100 that cause side-channel attacks may exploit a weak point for synchronous or clocked integrated circuit (IC) based systems such as ICs fabricated at foundries through side-channel attacks. Further, by leveraging Trojan circuits and monitoring power consumption, electromagnetic radiation, or other IC characteristics, a malicious agent or entity can compromise security and steal sensitive information like credit card pin numbers and secret keys through such side-channel attacks. The Trojan circuit 100 acts as an extra hidden circuit that may be added by the manufacturer during the IC fabrication process and may be used to provide feedback to the manufacturer on the manufacturing process. However, the Trojan circuit 100 may also be used subversively to leak secret or private information during regular operation of the IC.

Side-channel attacks by the Trojan circuit 100 can make use of indirect measures to exploit either existing or added Trojan circuitry to obtain secret or private information from the IC. Side channel attacks can leverage temperature variations, electromagnetic radiation, power usage, or other measurable characteristics during regular IC operation. The Trojan circuit 100 of FIG. 1 that may otherwise attack MPGA or FPGA cell architecture includes a pseudorandom number generator (PRNG) 102, secret keys K=$k_1$ through $k_n$, XOR gates 104, and capacitive loads 106. The Trojan circuit 100 is representative of a Malicious Off-chip Leakage Enabled Side-channel (MOLES) type of Trojan circuit. An IC system weakness that can be exploited by the MOLES Trojan is synchronized power spikes caused by combinational switching that occur during every clock cycle. By collecting synchronized sets of transient power readings over long periods of time, a malicious agent can use spread spectrum techniques and detect the secret key K stored in the firmware on the IC. A covertly inserted Trojan circuit 100 and such an exploitation of the synchronized power readings may be the primary enablers of the MOLES based side-channel attacks.

An approach to mitigate such side-channel attached involves use of clockless asynchronous digital design through clockless logic. For example, clockless logic in conjunction with MPGA technology may offer a defense against side-channel attacks through inclusion of distributed switching that is difficult to monitor and regular structures that increase the difficulty of adding Trojan circuits during IC fabrication. MPGA technology requires a base cell that is a complete set of logic that can be wired together to form any digital system. The embodiments described herein may use complementary metal-oxide-semiconductor (CMOS) transistors to implement a single THx2 threshold cell capable of performing both TH12 and TH22 asynchronous operations with respect to both MPGA and FPGA technologies as described in greater detail further below. The THx2 threshold cell implementation described herein makes it possible to form a complete set of asynchronous threshold gates and a complete set of standard combinational logic functions.

Referring to FIG. 2, an example THMn threshold gate symbol 200 with n inputs 202 and a threshold M 204 is shown. For example, n inputs of 2 and a threshold M would be a THx2 threshold gate cell in a THx2 mode to generate an output 206. In a TH12 mode, the TH12 gate cell includes a threshold M=1 and n=2 inputs. In a TH22 mode, the TH12 threshold gate cell includes a threshold M=2 and n=2 inputs. In Null Convention Logic (NCL) circuits to use with such a threshold gate, data flows through the networks in waves, and a data wave is only processed when all incoming data is available to thus make it self-timed. As data is only processed when available, no timing assumptions are required. Such an attribute guarantees data sequencing and correct data arrival at the receiver under varying gate, process and wire delays. Further, NCL data, logic, and control signals use a multi-rail encoding scheme in which one rail represents the logic '1' value and one rail the logic '0' value. For example, a signal A may have a logic '1' wire as A_1 and a logic '0' wire as A_0. Such NCL asynchronous circuits may offer advantages to side-channel attack avoidance such as being distributed in time (i.e., unsynchronized) and involving low power consumption.

Threshold gates include two or more inputs 202 to generate an output 206 and may be used with hysteresis to implement the asynchronous, clockless NCL circuits. The output of the gate is asserted (i.e., set) if the gate has a valid 'DATA' value on M (the threshold) of its n inputs. Thus, when the threshold is met, the output is asserted and stays asserted (in hysteresis) until all the n inputs have transitioned back to 'NULL' in the reset phase. The THx2 cell described herein is capable of implementing both TH12 and TH22 gates as modes, thus forming a complete set of logic.

The THx2 threshold gate cell may include a mode-independent PMOS configuration, and an NMOS configuration configured to operate in one of a TH12 mode and a TH22 mode. The x may be set to a threshold of 1 to operate in the TH12 mode and a threshold of 2 to operate in the TH22 mode. In embodiments, the mode-independent PMOS configuration and the NMOS configuration may be configured to form a NAND gate.

II. FIGS. 3-9: THx2 MPGA Base Cell with TH12 and TH22 Modes

FIGS. 3-9 are directed to a THx2 mask programmable gate array (MPGA) base cell including TH12 and TH22 modes, as described in greater detail below. An MPGA is an asynchronous implementation technology that is a type of prefabricated IC that may later be used in an additional fabrication process to add of metal layers that make signal connections. For example, MPGAs may include 2-D arrays of millions of NAND gates, which form a complete set of logic to be connected to form any digital system. The additional fabrication process to complete MPGA designs involves addition of metal layers, which leads to significantly shorter fabrication cycles such as weeks versus the process of Application Specific Integrated Circuits (ASICs) that may take several months.

In embodiments, described herein, the THx2 MPGA base cell is configured to provide a side-channel attack proof MPGA architecture suitable for NCL asynchronous digital designs. Such architecture is based on a minimum sized, multi-mode THx2 threshold gate, with Euler paths used to minimize the area. The THx2 MPGA base cell is configured to use the Euler paths to enable THx2 modes and eliminate NMOS feedback effects for the TH12 mode by setting its source and drain to VSS. The THx2 cell forms a complete set of logic and can be used to implement any synchronous or asynchronous digital circuit. A complete set of threshold gates can also be formed using the two basic modes of the THx2 cell. Further, the THx2 cell can be overlapped on three sides to form a compact area efficient 2-D array for the MPGA.

MPGAs form a class of Application Specific Integrated Circuits (ASICs) and are manufactured through a two-stage process that can take advantage of split manufacturing. During the first stage, all of the base layers of the MPGA base cell, including wells, diffusion, diffusion vias, polysilicon ("poly"), and any other suitable base layers and/or base layer materials, are fabricated. A very compact, basic logic gate or cell is created during processing of the first stage. During the first stage, a complete IC or wafer is fabricated with nothing but this base cell being replicated over and over. As a requirement of the base gate type is that it form a complete set of logic such that, by combining the base gates together, any digital circuit or system can be formed. A base cell example is the NAND gate, which forms a complete set of logic such that by wiring NAND gates together any digital circuit can be implemented.

After processing of the first stage, a die or wafer with uncommitted MPGA base cells is ready for later use and wiring. When a digital IC system is needed, the uncommitted MPGA base cell is used during a second stage in which the rest of the diffusion vias and metal layers are added to wire together the MPGA base cells to form a desired digital system. Diffusion vias are understood by those skilled in the art to be contacts connecting a lowest metal layer to diffusion or poly. The two stages may occur at different manufacturing facilities, providing an extra layer of security and trust available through split manufacturing.

Figure 3:
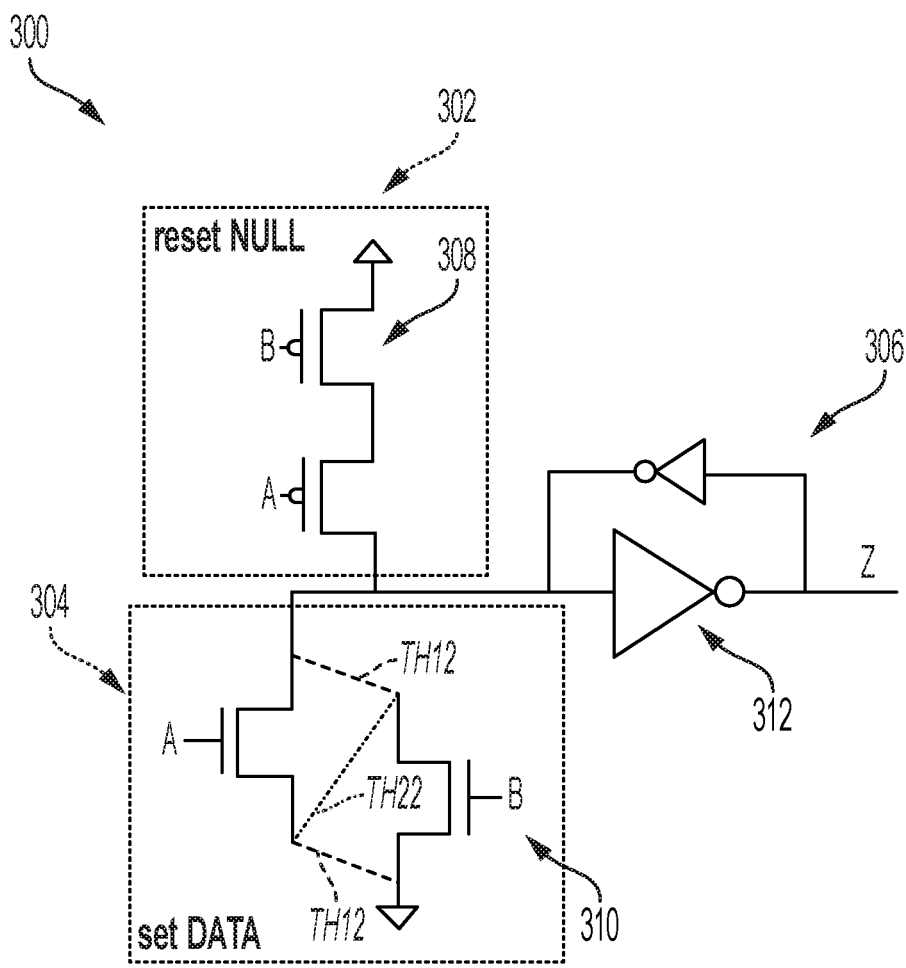
FIG. 3 is a schematic transistor diagram of a THx2 mask programmable gate array (MPGA) base cell including TH12 and TH22 modes, according to one or more embodiments as shown and described herein.

Referring to FIG. 3, a THx2 MPGA base cell 300 is shown including TH12 and TH22 modes. The THx2 MPGA base cell 300 may be communicatively coupled to an output network 306, which may include a pair of CMOS inverters 312. Setting x in THx2 to a threshold of 1 to operate in the TH12 mode may include connecting a pair of NMOS transistors 310 in parallel in the NMOS configuration to eliminate an NMOS transistor of the NMOS configuration in the TH12 mode for the MPGA as shown in FIG. 3. As further shown in FIG. 3, setting x in THx2 to the threshold of 2 to operate in the TH22 mode may include connecting the pair of NMOS transistors 310 in in series in the NMOS configuration for the MPGA.

To mitigate the effects and possibilities of side-channel attacks, the THx2 MPGA base cell 300 is configured to combine the advantages of asynchronous design such as distributed versus synchronized power usage and low power usage with advantages afforded by MPGA structures and the two stage processing. Such MPGA design advantages include regular structures that make it difficult for insertion of hidden Trojan circuits and trustable split manufacturing at multiple fabrication facilities. The THx2 MPGA base cell 300 is configured to enable such a synergistic asynchronous MPGA approach with a compact asynchronous base cell that forms a complete set of logic. The THx2 MPGA base cell 300 is configured to be capable of operating in either a TH12 or TH22 mode via simple wiring changes as shown in FIG. 3. To commit the cell to either the TH12 mode or the TH22 mode, the wiring changes take place during the second stage of the MPGA fabrication process and can use either Metal 1 or Metal 2 routing layers depending on how the cell is wired. The NMOS configuration may be configured to operate in one of the TH12 mode and the TH22 mode based on an additional NMOS wiring configuration to eliminate an NMOS transistor 310 in the TH12 mode, as described in greater detail with respect to FIGS. 4B, 5B, and 6B further below.

FIG. 3 shows a reset NULL block 302 including a pair of PMOS transistors 308 for inputs A and B in series to pull up when both PMOS transistors 308 are ON (for example, to positive voltage supply VDD) for NULL ('0') inputs. FIG. 3 further shows a set DATA block 304 with a pair of NMOS transistors 310 for inputs A and B. In embodiments, a mode-independent PMOS configuration includes the reset NULL block 302 and the pair of PMOS transistors 308 in series, and NMOS configuration includes the set DATA block 304 and the pair of NMOS transistors 310. The set DATA block 304 may connect the pair of NMOS transistors 310 in parallel in the TH12 mode and in series in the TH22 mode.

In embodiments, in the TH12 mode, the pair of NMOS transistors 310 for inputs A and B are in parallel to pull down to ground (for example, to negative voltage supply VSS) when either of the NMOS transistors 310 are ON for DATA ('1') inputs. The set DATA block 304 may include the pair of NMOS transistors 310 connected through the additional NMOS wiring configuration in parallel in the TH12 mode.

In the TH22 mode, the pair of NMOS transistors 310 for inputs A and B are in series to pull down to ground (for example, to negative voltage supply VSS) when the NMOS transistors 310 are ON for DATA ('1') inputs. The set DATA block 304 may include the pair of NMOS transistors 310 connected through the additional NMOS wiring configuration in series in the TH22 mode. The output Z in either mode is sent to the output network 306 and inverters 312. Each inverter 312 is a CMOS inverter including a PMOS transistor 308 and an NMOS transistor 310 as understood to those skilled in the art.

Figure 4A:
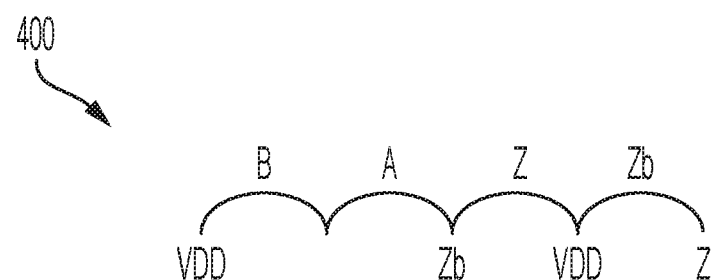
FIG. 4A is a P-type metal-oxide-semiconductor (PMOS) Euler diagram for the THx2 transistors of the THx2 MPGA base cell of FIG. 3.
Figure 4B:
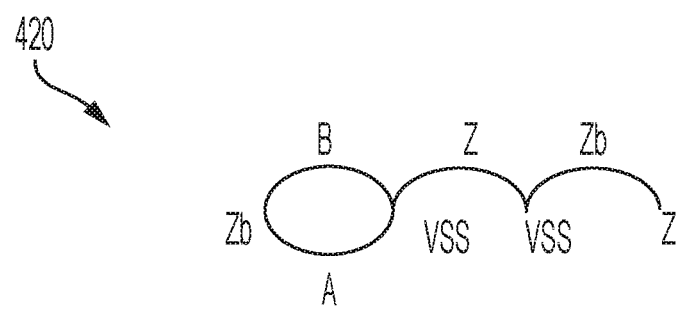
FIG. 4B is an N-type metal-oxide-semiconductor (NMOS) Euler diagram for the THx2 transistors of the THx2 MPGA base cell of FIG. 3 for the TH12 mode.
Figure 4C:
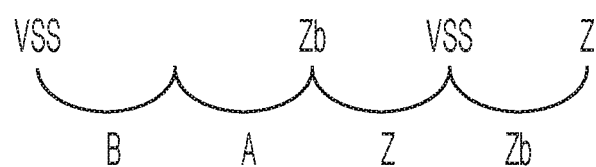
FIG. 4C is a NMOS Euler diagram for the THx2 transistors of the THx2 MPGA base cell of FIG. 3 for the TH22 mode.

The THx2 MPGA base cell 300 is configured to maintain a continuous diffusion region and minimize area through, for example, optimal Euler circuits as shown in FIGS. 4A-4B with common nodes for both the TH12 and TH22 modes of the THx2 threshold cell. FIG. 4A is representative of a PMOS Euler diagram 400 for the THx2 transistors of the THx2 MPGA base cell 300 of FIG. 3. FIG. 4A shows transistors A, B, Z, and Zb of the THx2 MPGA base cell 300 along with positive supply voltage VDD and negative supply voltage VSS. FIGS. 4B and 4C are representative of NMOS Euler diagrams 420, 440 for the TH12 and TH22 modes, respectively. For instance, FIG. 4B is a NMOS Euler diagram 420 for the THx2 transistors of the THx2 MPGA base cell 300 for the TH12 mode, and FIG. 4C is a NMOS Euler diagram 440 for the THx2 transistors of the THx2 MPGA base cell 300 for the TH22 mode. Through the PMOS Euler diagram 400 in combination with the NMOS Euler diagram 420 for the TH12 mode or the NMOS Euler diagram 440 for the TH22 mode, common Euler paths for both the TH12 and the TH22 modes may be employed without diffusions breaks to minimize area usage. As explained further below, such common Euler paths are available due to an elimination of an extraneous transistor of the TH12 mode circuit, which transistor is utilized in the TH22 mode.

The THx2 cell layout of the THx2 MPGA base cell 300 is area optimized by minimizing the number of diffusion breaks and determining a common node position for both the TH12 and TH22 modes as shown through the associated Euler graphs of FIGS. 4A-4C. For example, FIG. 4A shows the common, mode-independent PMOS Euler graph 400 for the PMOS transistors 308 of both the TH12 and TH22 gates of the TH12 and TH22 modes of the THx2 MPGA base cell 300 of FIG. 3. The NMOS Euler graphs 420, 440 for the NMOS transistors 310 of the TH12 and TH22 gates in FIGS. 4B and 4C, respectively, match the PMOS Euler graph 400 of FIG. 4A through a common gate arrangement with the negative supply voltage VSS on one end and the common Z terminal on the other end. The common gate arrangement is based on an attribute of the TH12 gate. When holding the output value at '1' after being asserted, the NMOS transistor 310 in the small feedback inverter 312 of TH12 can be considered extraneous. Therefore, both ends could be tied to the negative supply voltage VSS to allow for common NMOS Euler paths (between transistors Zb, Z, A, B) for both the TH12 gate with the NMOS Euler graph 420 of FIG. 4B and the TH22 gate with the NMOS Euler graph 440 of FIG. 4C. Such a common arrangement leads to common, unbroken diffusion areas for both the TH12 and TH22 modes of the THx2 MPGA base cell 300.

Figure 5A:
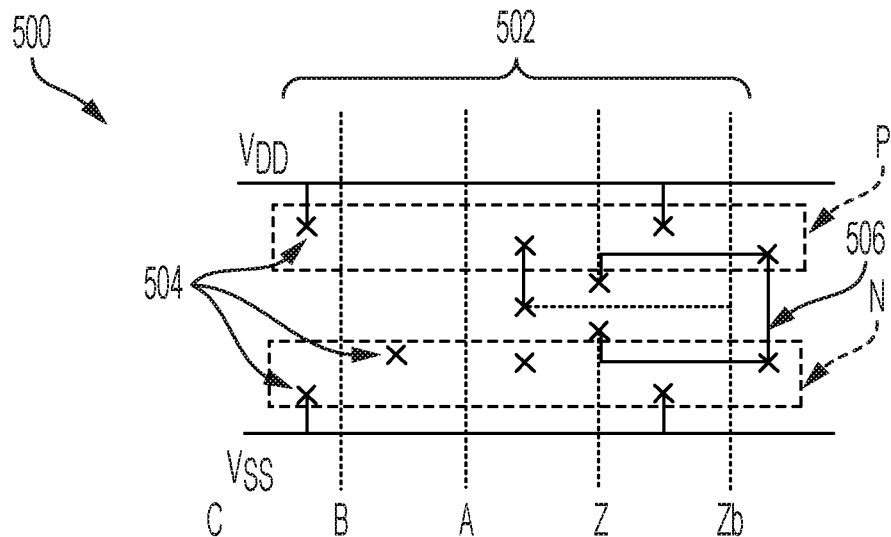
FIG. 5A is a stick diagram for the THx2 transistors of the THx2 MPGA base cell of FIG. 3.
Figure 5B:
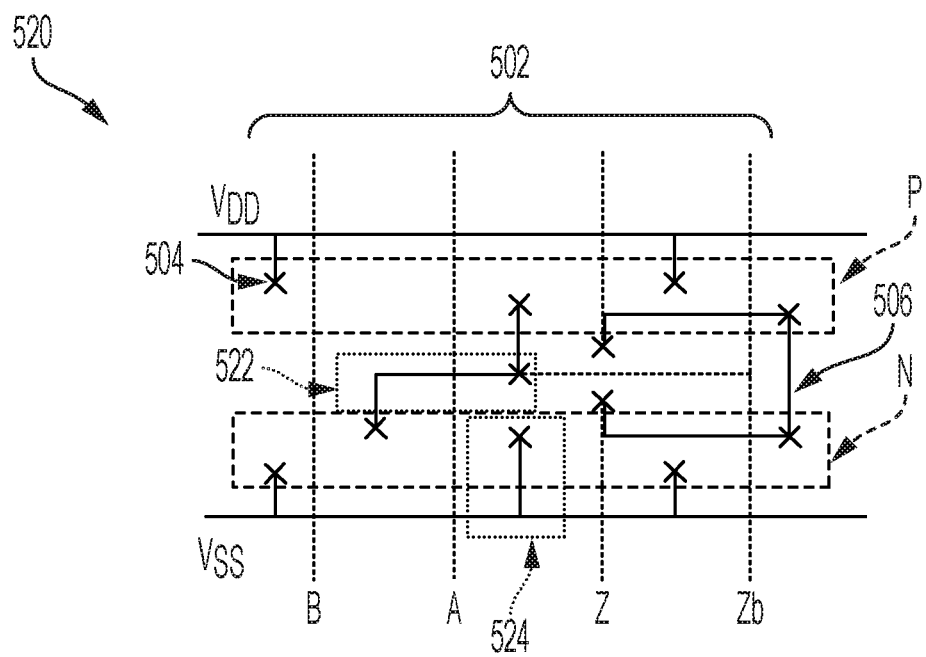
FIG. 5B is a stick diagram for the THx2 transistors of the THx2 MPGA base cell of FIG. 3 for the TH12 mode.
Figure 5C:
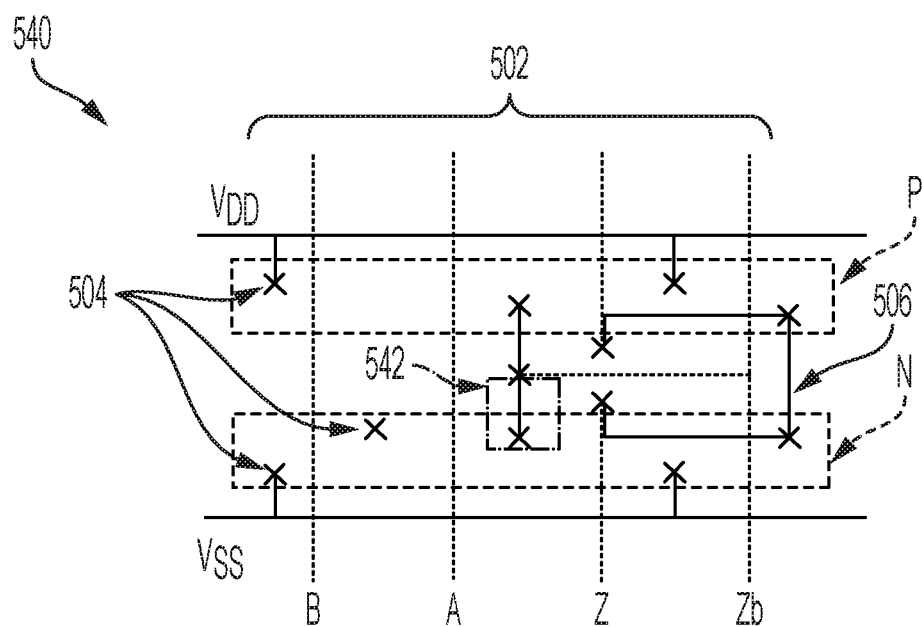
FIG. 5C is a stick diagram for the THx2 transistors of the THx2 MPGA base cell of FIG. 3 for the TH22 mode.

FIG. 5A is a stick diagram 500 for the THx2 transistors of the THx2 MPGA base cell 300 of FIG. 3, FIG. 5B is the stick diagram 520 for the THx2 transistor 310 of the THx2 MPGA base cell 300 for the TH12 mode, and FIG. 5C is the stick diagram 540 for the THx2 transistors of the THx2 MPGA base cell 300 for the TH22 mode. The stick diagrams 500, 520, and 540 show nodes 504, which may be source or drain nodes for transistors A, B, Z, Zb as transistors 502. By way of example, and not as a limitation, transistors 502 are CMOS transistors connecting through a poly layer a PMOS transistor 308 and an NMOS transistor 310. The nodes 504 are disposed in a P-region P (for PMOS transistors 308) that is coupled to positive supply voltage VDD and an N-region N (for NMOS transistors 310) that is coupled to negative voltage supply VSS. Such coupling is reflected through paths 506, which may be metal wiring connections, for example. The stick diagram 500 of FIG. 5A reflects the THx2 MPGA base cell 300 after a first stage processing without second stage wiring yet made to create either the TH12 mode of FIG. 5B or the TH22 mode of FIG. 5C. To create the TH12 mode of FIG. 5B, paths 506 are wired between nodes 504 in regions 522 and 524. In region 524, the node 504 of extraneous transistor Z is connected to ground such that both source and drain nodes 504 of NMOS transistor Z (e.g., NMOS transistor 310 of CMOS transistor Z) are connected to ground (e.g., negative voltage supply VSS). Alternatively, to create the TH22 mode of FIG. 5C, paths 506 are wired between nodes 504 in region 542.

Figure 6A:
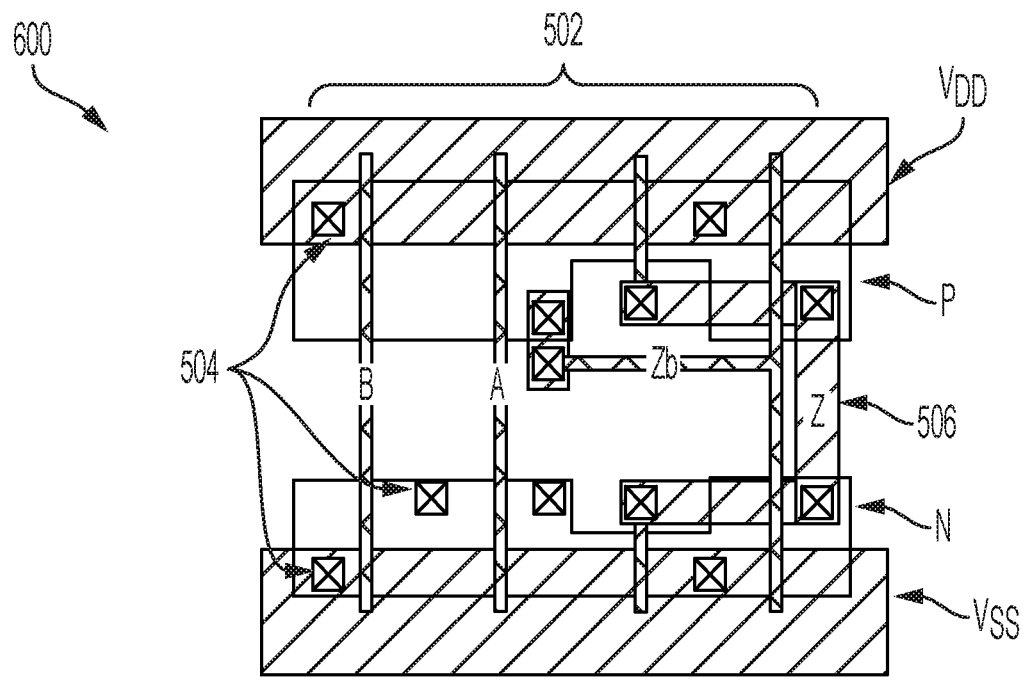
FIG. 6A is a topological fabrication layout for the THx2 transistors of the THx2 MPGA base cell of FIG. 3.
Figure 6B:
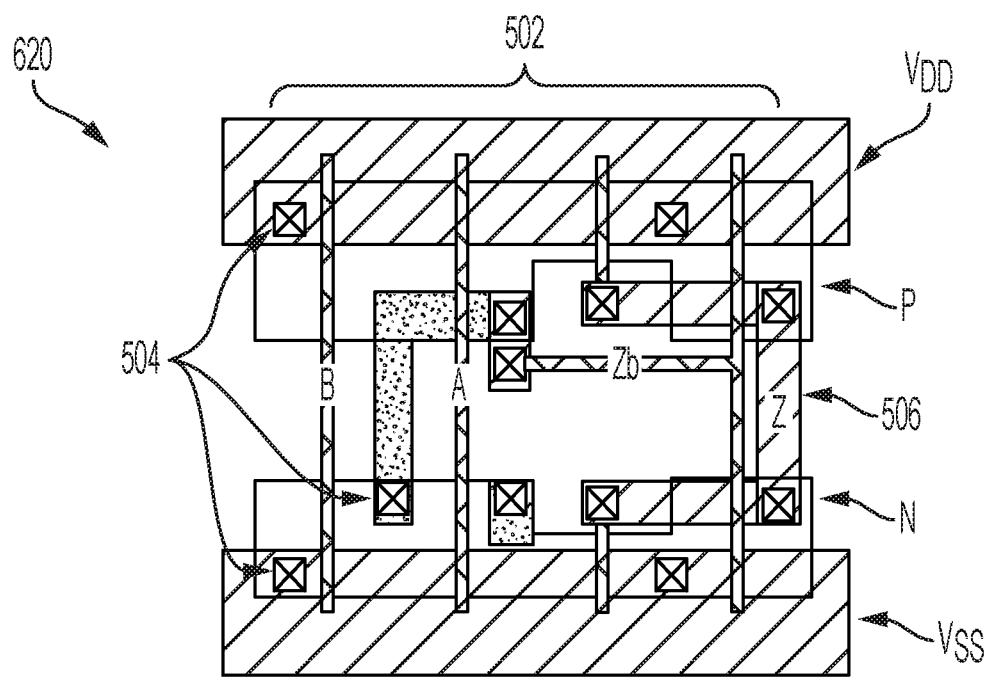
FIG. 6B is a topological fabrication layout for the THx2 transistors of the THx2 MPGA base cell of FIG. 3 for the TH12 mode.
Figure 6C:
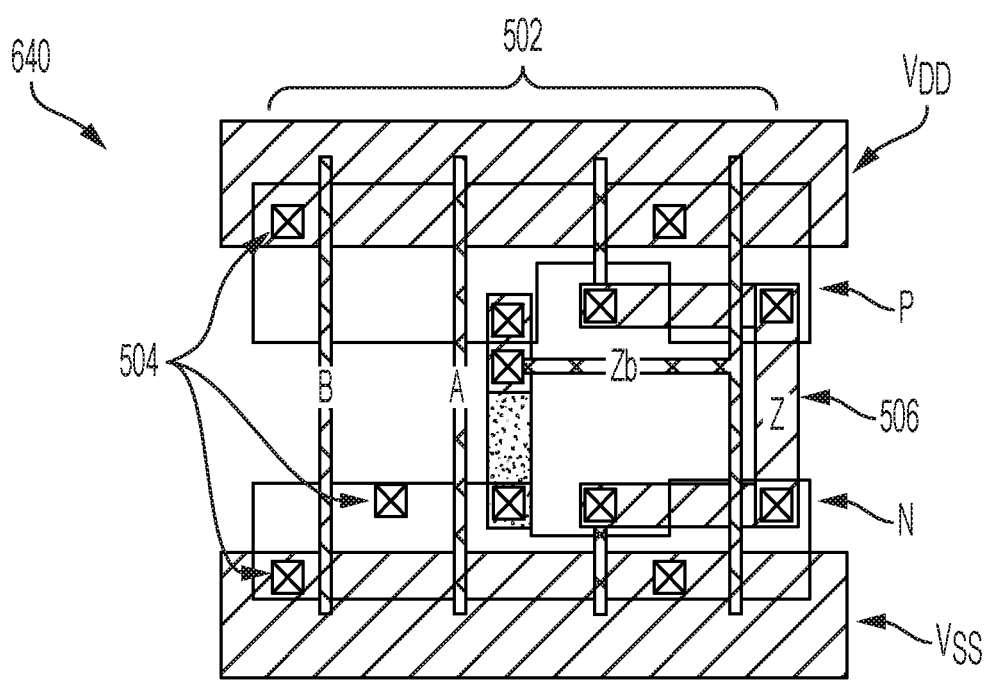
FIG. 6C is a topological fabrication layout for the THx2 transistors of the THx2 MPGA base cell of FIG. 3 for the TH22 mode.

FIG. 6A is a topological fabrication layout 600 for the THx2 transistors of the THx2 MPGA base cell 300 of FIG. 3, FIG. 6B is a topological fabrication layout 620 for the THx2 transistors of the THx2 MPGA base cell 300 for the TH12 mode, and FIG. 6C is a topological fabrication layout 640 for the THx2 transistors of the THx2 MPGA base cell 300 for the TH22 mode. The topological fabrications layouts 600, 620 and 640 of FIGS. 6A-6C respectively correspond to the stick diagrams 500, 520, and 540 of FIGS. 5A-5C.

As shown in FIGS. 5B and 6B, to commit the THx2 cell 300 to the TH12 mode, and during the second stage of MPGA processing, a metal wire is connected in a path 506 from the source node 504 of NMOS transistor A (e.g., NMOS transistor 310 of CMOS transistor A) in the N-region N to the negative supply voltage VSS rail as depicted in region 524, and a metal wire is connected in a path 506 from the drain node 504 of NMOS transistor A in the N-region N to the drain node 504 of PMOS transistor A (e.g., PMOS transistor 308 of CMOS transistor A) in the P-region P as depicted in region 522. As shown in FIGS. 5C and 6C, to commit the THx2 cell 300 to the TH22 mode, and during the second stage of MPGA processing, a metal wire is connected in a path 506 from the drain node 504 of NMOS transistor A in the N-region N to the drain node 504 of PMOS transistor A in the P-region P as depicted in region 524. It should be understood within this disclosure that source and drain node locations are described using convention as known to one skilled in the art in which a source node of a transistor is the node closest to the corresponding supply voltage.

Figure 7:
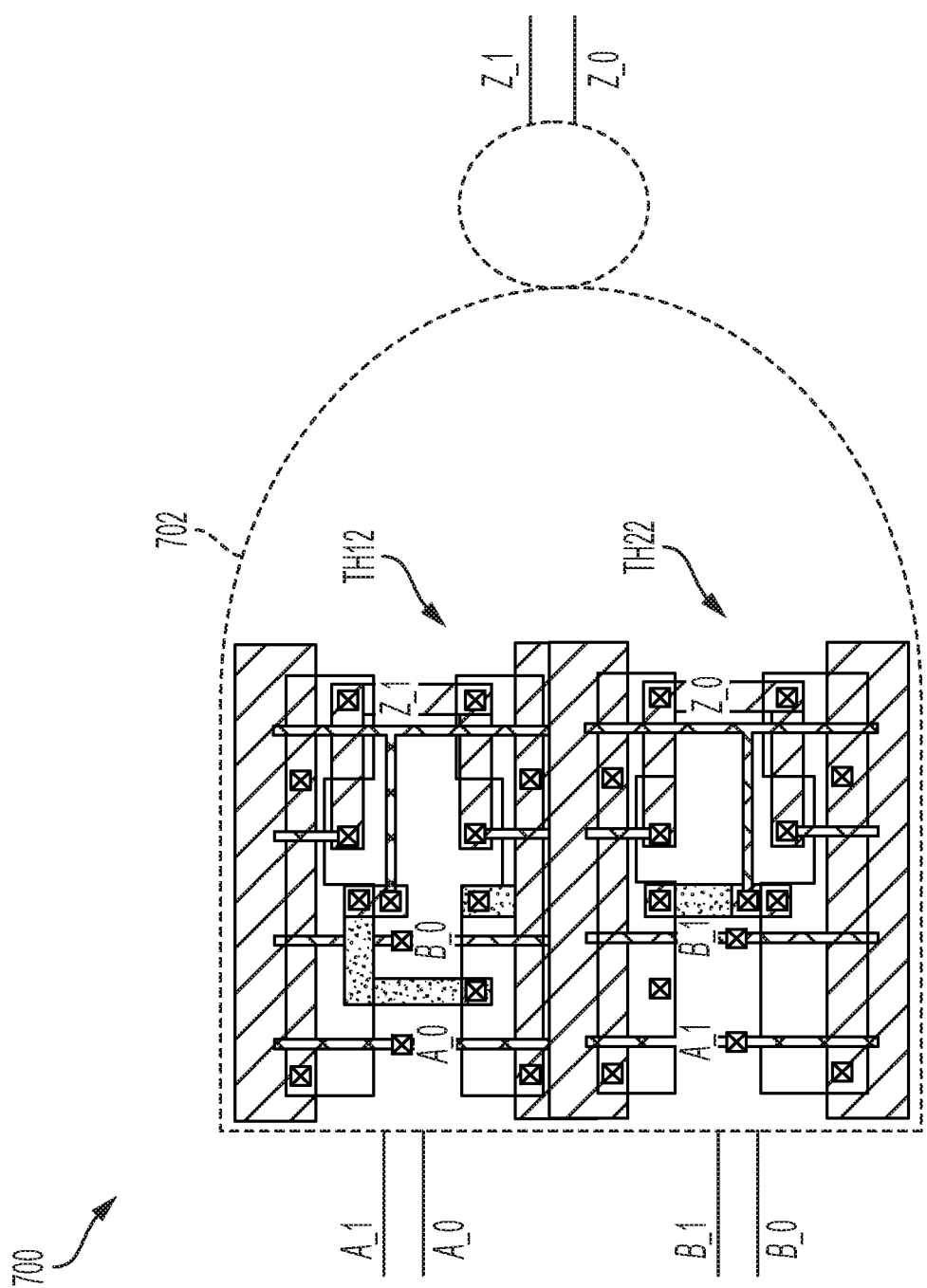
FIG. 7 is a topological fabrication layout for a vertical NAND gate formed using the THx2 transistors of the THx2 MPGA base cell of FIG. 3 in either of the TH12 mode or the TH22 mode.

The THx2 MPGA base cell 300 may be used with a set of libraries to further use with standard computer-aided design (CAD) tools to synthesize digital designs and/or with specialized CAD tools that target asynchronous designs. Embodiments of CAD tools for utilization may include CAD solutions available from Cadence Design Systems, Inc. of San Jose, California, or Synopsys, Inc. of Mountain View, CA Two basic approaches may accomplish the task, such as through creation of a set of standard asynchronous logic gates like NAND, NOR, AND, OR, and the like, or through creation of a set of standard threshold gates like TH12, TH22, TH13, TH23, TH33, or the like. The THx2 MPGA base cell 300 described herein may be used with either approach. By way of example, and not as a limitation, the THx2 MPGA base cell 300 may form a standard NAND gate as shown in FIG. 7. The THx2 MPGA base cell 300 described herein includes a complete set of logic and is configured to be used to design logic gate and threshold functions.

FIG. 7 is a topological fabrication layout 700 for a vertical NAND gate 702 formed using the THx2 transistors of the THx2 MPGA base cell 300 of FIG. 3 in either of the TH12 mode or the TH22 mode. FIG. 7 illustrates an asynchronous version of a NAND function that is formed using the THx2 MPGA base cell 300 in either the TH12 mode or the TH22 mode. The process to build the NAND function makes use of the basic equations of the TH12 and TH22 modes of the THx2 MPGA base cell 300.

The equation for the TH12 mode is of the form A+B=Z, which implies if either TH12 input A or B has DATA on it, then output Z will also be DATA. The TH12 mode is mapped to the logic 1' wire of the NAND output Z_1. When either logic '0' wire on a TH12 NAND input A (A_0) or B (B_0) is asserted (i.e., has DATA on it), the TH12 output Z_1 will also be asserted such that the NAND output is logic 1' if either input is a logic '0'. Thus, NAND inputs A_0, B_0, and NAND output Z_1 are mapped to the TH12 mode of the THx2 MPGA base cell 300 as shown in FIG. 7.

The equation for the TH22 mode is of the form A+B=Z, which implies if both TH22 inputs A and B have DATA on them, then output Z will also be DATA. The TH22 mode is mapped to the logic '0' wire of the NAND output Z_0. When both the logic 1' wires on the TH22 NAND inputs A (A_1) and B (B_1) are asserted (i.e., have DATA on them), the TH22 NAND output Z_0 will also be asserted such that the NAND output is logic '0' if both NAND inputs are logic '1'. Thus, NAND inputs A_1, B_1, and NAND output Z_0 are mapped to the TH22 mode of the THx2 MPGA base cell 300 as shown in FIG. 7.

For an effective THx2 MPGA base cell 300 operation, a size of the feedback inverter needs to be minimized. Further, the widths of the devices in the set to DATA and reset to NULL sub-circuits of FIG. 3 are to be sized large enough to overpower the feedback inverter. The size may be varied to provide more delay and less area or vice versa. To test the TH12 and TH22 modes of the THx2 MPGA base cell 300, the TH12 and TH22 modes were tested. Spice models from a Simulated Program with Integrated Circuit Emphasis (SPICE), which is an open source analog electronic circuit simulator, were extracted from the cell layouts as shown respectively in FIGS. 8 and 9. Thus, the simulations 800, 900 in FIGS. 8 and 9 show the output waveforms in volts (V) over time (T) for the TH12 and TH22 modes of the THx2 MPGA base cell 300, respectively.

Figure 8:
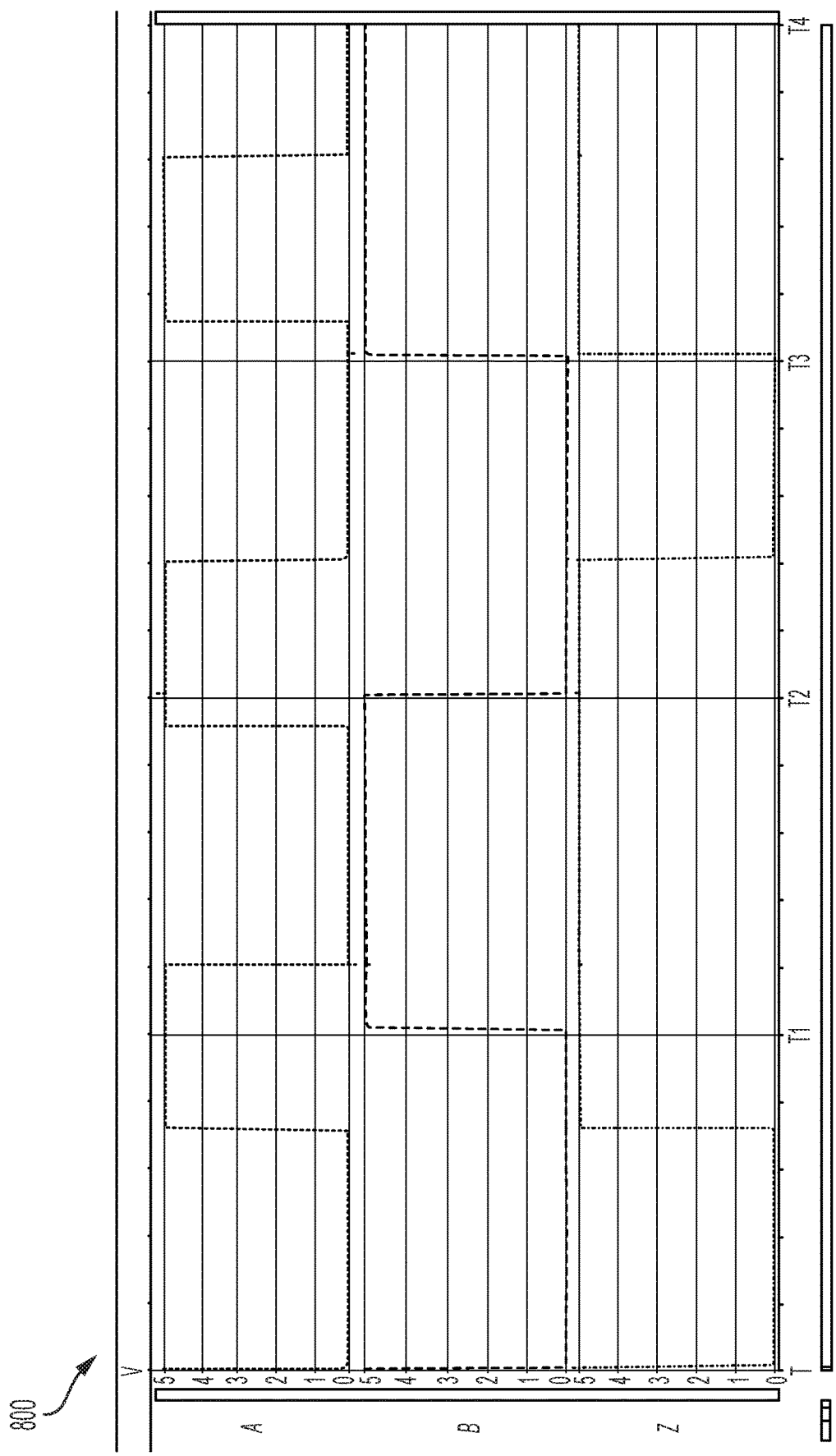
FIG. 8 is a graphical illustration of a simulation of the inputs and outputs of the THx2 MPGA base cell of FIG. 3 for the TH12 mode.

FIG. 8 is a graphical illustration of the simulation 800 of the inputs and outputs of the THx2 MPGA base cell 300 for the TH12 mode. For the TH12 mode of FIG. 8, the inputs A and B are set to NULL to reset the output Z to NULL. Combinations of the inputs A and B set to DATA and NULL are cycled through, and the output Z is shown to verify that with any input value set to DATA, the output is also DATA. Thus, the TH12 mode A+B=Z of the THx2 MPGA base cell 300 is functioning as expected.

Figure 9:
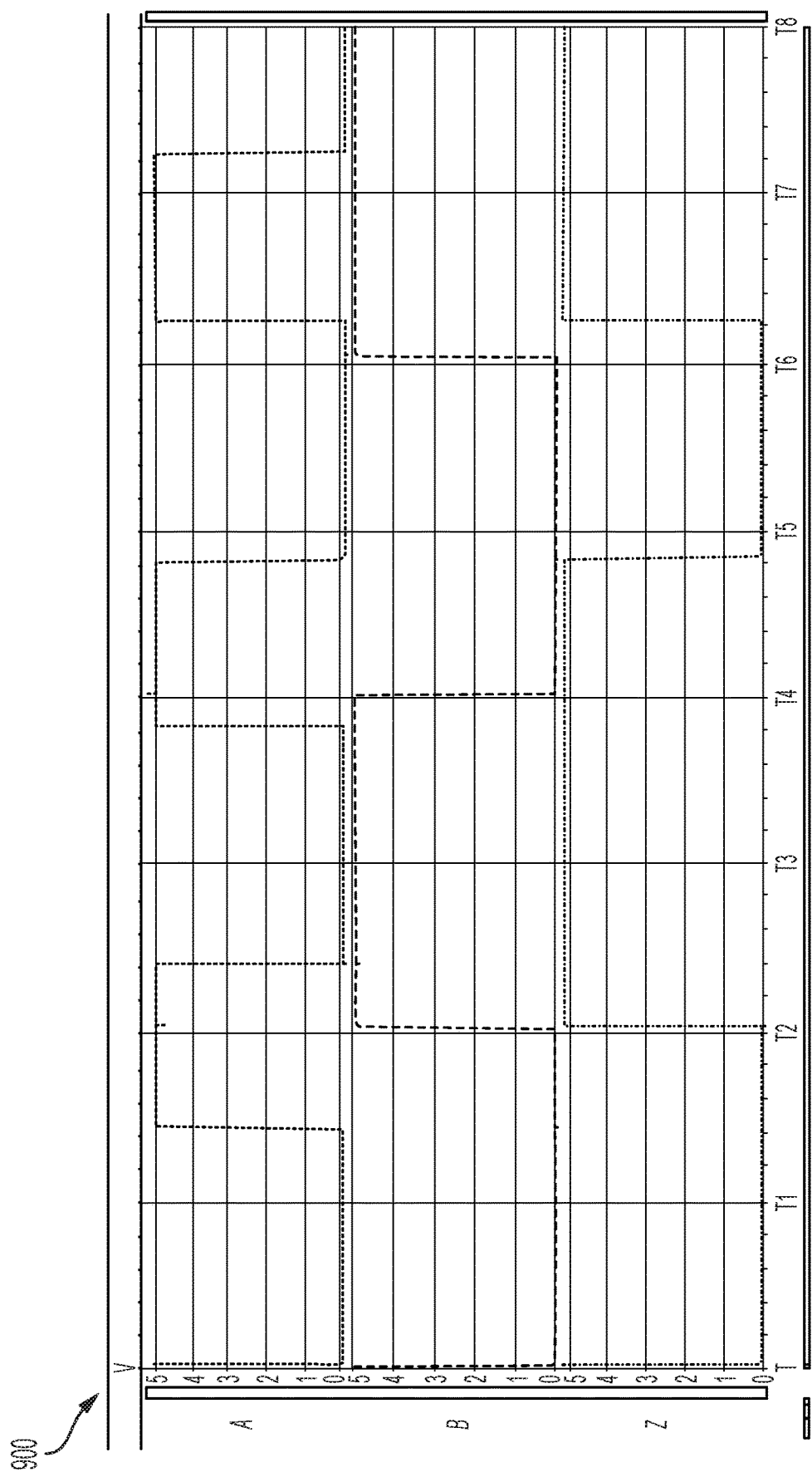
FIG. 9 is a graphical illustration of a simulation of the inputs and outputs of the THx2 MPGA base cell of FIG. 3 for the TH22 mode.

FIG. 9 is a graphical illustration of the simulation 900 of the inputs and outputs of the THx2 MPGA base cell 300 for the TH22 mode. For the TH22 mode of FIG. 9, the inputs A and B are set to NULL to reset the output Z to NULL. Combinations of the inputs set to DATA and NULL are cycled through, and the output Z verifies that with both input values set to DATA, the output is also DATA. For the TH22 mode, we also see that once the output is set to DATA, the output stays DATA until all inputs go back to NULL. This simulation models the hysteresis effect required for proper operation of the TH22 function and the A+B=Z form of the TH22 mode of the THx2 MPGA base cell 300.

III. FIGS. 10-15: THx2 FPGA Base Cell with TH12 and TH22 Modes

Figure 10:
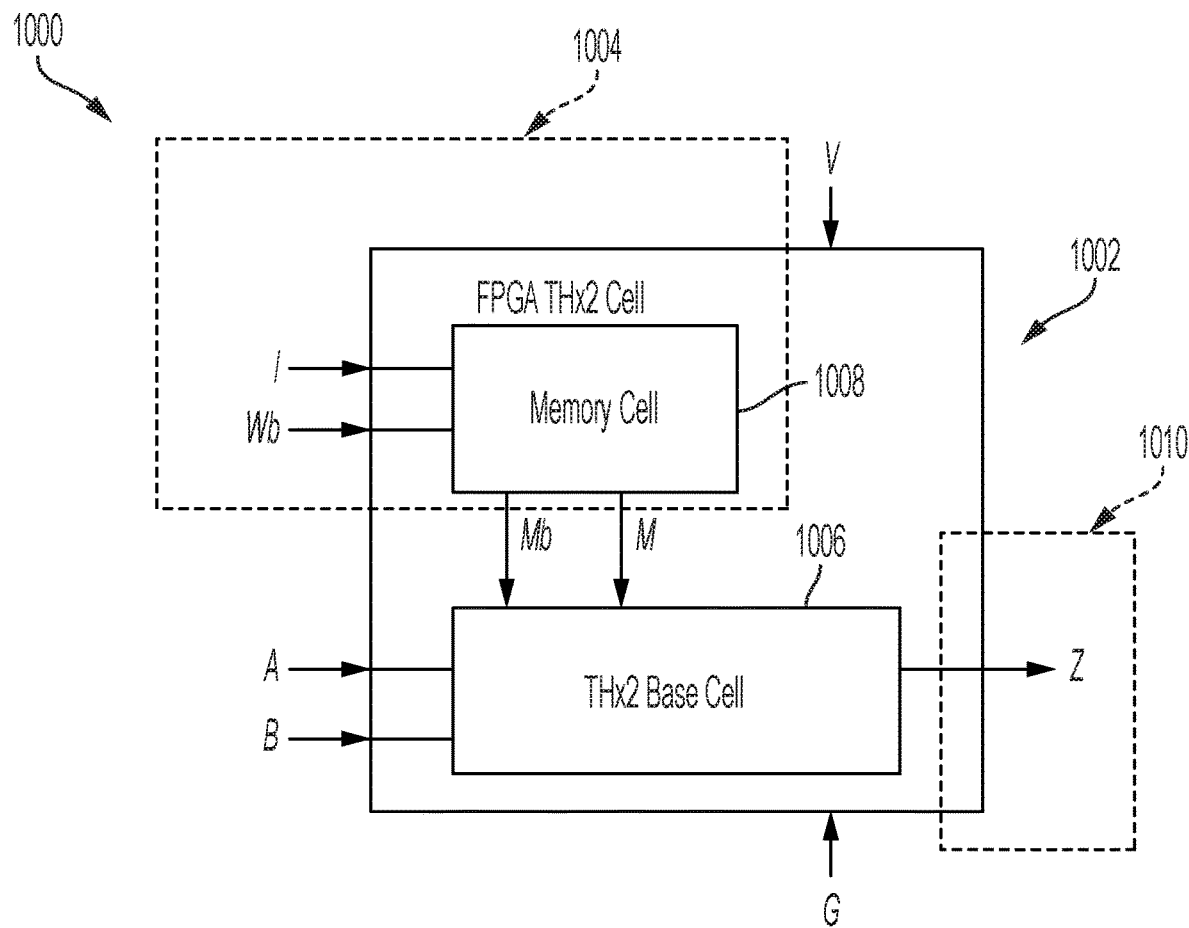
FIG. 10 is a schematic block diagram of a THx2 field programmable gate array (FPGA) cell including a memory cell and a base cell for the TH12 and TH22 modes, according to one or more embodiments as shown and described herein.
Figure 11:
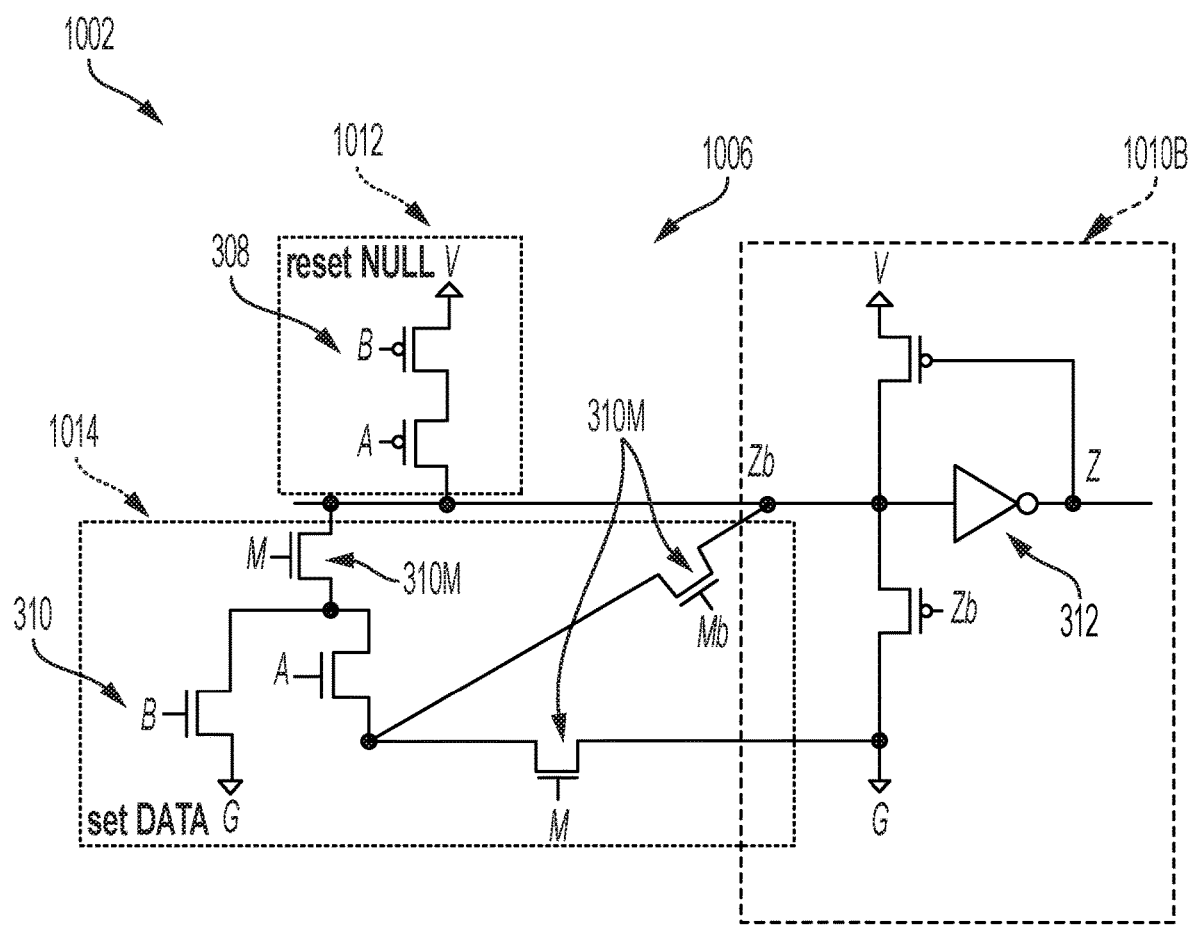
FIG. 11 is a schematic transistor diagram of the base cell of the THx2 FPGA cell of FIG. 10.

FIGS. 10-15 are directed to a THx2 field programmable gate array (FPGA) cell including a memory cell and a base cell for the TH12 and TH22 modes, as described in greater detail further below. As described herein, the THx2 FPGA cell 1000 of FIG. 10 is configured to mitigate side-channel attacks. FPGAs utilize a base cell that can implement a complete set of logic to be connected through the programmable interconnect network to form a digital system in the field. The THx2 FPGA cell 1000 utilizes CMOS transistors to implement a programmable THx2 threshold cell configured to perform both TH12 and TH22 asynchronous operations as described in greater detail further below. In an embodiment, the THx2 FPGA cell 1000 includes a sixteen (16) transistor FPGA cell with eight (8) transistors as shown in FIG. 11 (through transistors 308, 310, 312) to implement the base THx2 threshold operation, three (3) transistors 310M as shown in FIG. 11 to switch between the TH12 and TH22 modes, and five (5) memory cell transistors as show in FIG. 12 to store the mode of the programmable cell. Such a minimal number of transistors and programmable THx2 implementation through the THx2 FPGA cell 1000 is configured to enable formation of a complete set of asynchronous threshold gates and a complete set of standard combinational logic functions. Further, the symmetric nature of the THx2 FPGA cell 1000 in regard to the number of transistors (i.e., eight NMOS and eight PMOS transistors as described below) enables the cell 1000 for use for a four row by four column transistor layout with a nearly square, easily arrayable layout. The THx2 FPGA cell 1000 is configured to be suitable for MOSFET or FinFET implementation to mitigate against or prevent Trojan circuits 100 that may be used for side-channel attacks such that the cell 1000 may be Trojan proof to safeguard against tampering.

FIG. 10 depicts a block diagram of a THx2 FPGA cell 1000 including a cell architecture portion 1002 for a base cell 1006 for the TH12 and TH22 modes and a memory cell portion 1004 including a memory cell 1008. An output Z is output in an output network 1010 of the THx2 FPGA cell 1000. The V and G are the positive and negative supply voltages, VDD and VSS, respectively. For example, G is indicative of ground. The input I is for the value to be stored in the programming memory cell 1008, and the input Wb is the active low write enable signal to program the memory cell 1008. The inputs A and B are the THx2 threshold function inputs of the base cell 1006, and the output Z is the THx2 threshold function output of the base cell 1006. The internal signal M and Mb, where Mb is the logic inverse of M, control the mode of the base cell 1006 of the THx2 FPGA cell 1000. As described in greater detail below, a value of '1' on M and '0' on Mb from the memory cell 1008 puts the base cell 1006 of the THx2 FPGA cell 1000 in the TH12 mode, and a value of '0' on M and '1' on Mb from the memory cell 1008 puts the base cell 1006 of the THx2 FPGA cell 1000 in the TH22 mode.

Figure 12:
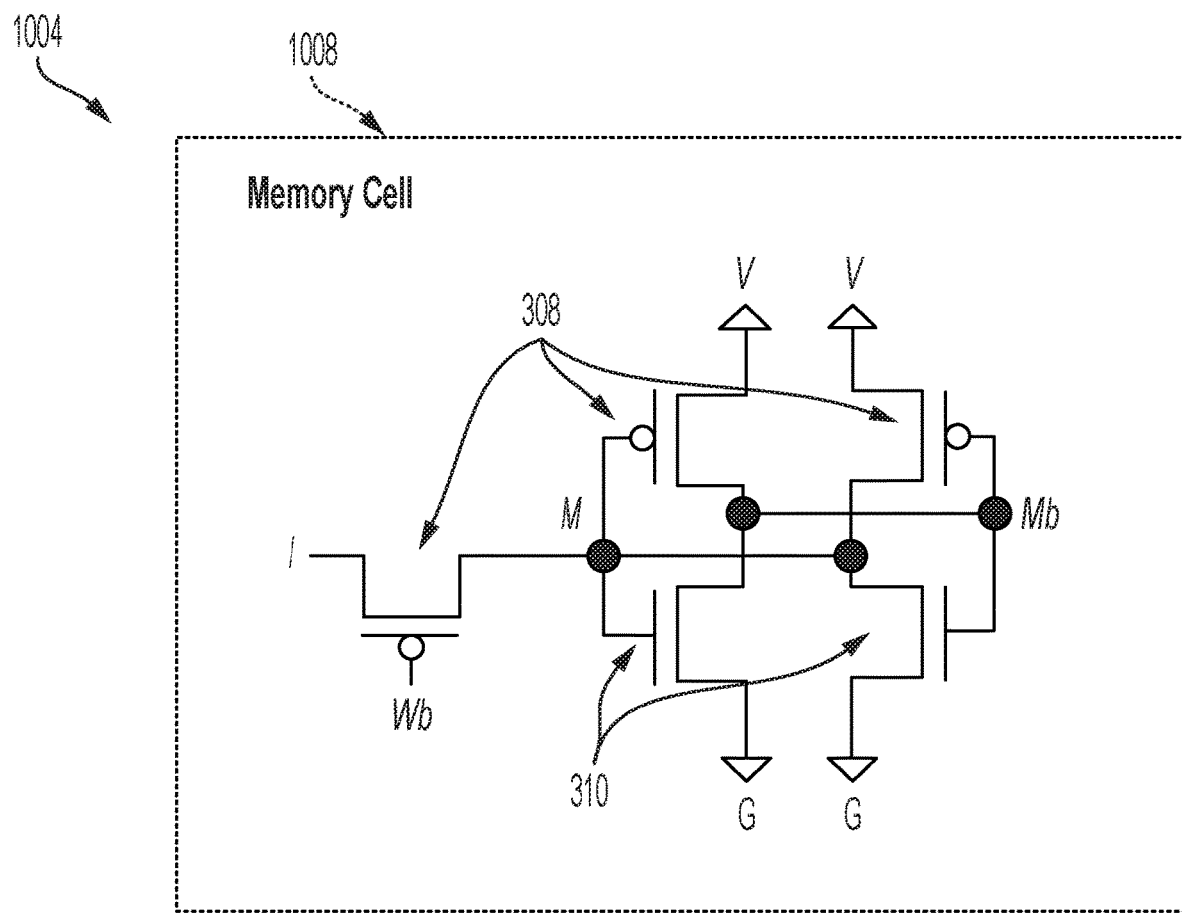
FIG. 12 is a schematic transistor diagram of an example embodiment of the memory cell of the THx2 FPGA cell of FIG. 10.

The THx2 FPGA cell 1000 of FIG. 10 includes two primary subcomponents of an eleven (11) transistor base cell 1006 (as shown in FIG. 11) and, in the non-limiting example embodiment shown, a five (5) transistor memory cell 1008 (as shown in FIG. 12). The base cell 1006 and the memory cell 1008 form a programmable, asynchronous THx2 FPGA cell 1000 that can be used to implement a digital system when arranged in a two-dimensional (2D) array. The THx2 FPGA cell 1000 of FIG. 10 may include a mode-independent PMOS configuration with a set of eight PMOS transistors and an NMOS configuration with a set of eight NMOS transistors. The THx2 FPGA cell 1000 of FIG. 10 may further include an output network 1010. As shown in FIGS. 11 and 13B, the output network 1010 may be a modified output network 1010B that includes a portion of each of the mode-independent PMOS configuration and the NMOS configuration to include (i) three transistors of the set of eight PMOS transistors 308 and (ii) one transistor of the set of eight NMOS transistors 310. Referring again to FIGS. 10 and 11, the THx2 FPGA cell 1000 may further include the base cell 1006 and the memory cell 1008. The memory cell 1008 may include (i) three transistors of the set of eight PMOS transistors 308 and (ii) two transistors of the set of eight NMOS transistors 310. The base cell 1006 may include the modified output network 1010B, the reset NULL block 302, and the set DATA block 304. The reset NULL block 302 may include two transistors of the set of eight PMOS transistors 308, and the set DATA block 304 may include five transistors of the set of eight NMOS transistors 310.

The memory cell 1008 may be configured to transmit a signal M and a logical inverse signal Mb, and the base cell 1006 may be configured to receive the signal M and the logical inverse signal Mb. The NMOS is configuration may be configured to operate in one of the TH12 mode and the TH22 mode based on an NMOS programmed configuration, and the NMOS programmed configuration may be programmed such that (i) a value of 1 on the signal M and a value of 0 on the logical inverse signal Mb from the memory cell is configured to operate the base cell in the TH12 mode and (ii) a value of 0 on the signal M and a value of 1 on the logical inverse signal Mb from the memory cell is configured to operate the base cell in the TH22 mode. In embodiments, two NMOS transistors 310M in the base cell 1006 are configured to receive the value of 1 on the signal M such that a pair of NMOS transistors 310 in the base cell 1006 are configured to receive respective inputs A, B and be connected in parallel in the TH12 mode. One NMOS transistor 310M in the base cell 1006 may be configured to receive the value of 1 on the logical inverse signal Mb such that the pair of NMOS transistors 310 in the base cell 1006 configured to receive respective inputs A, B are configured to be connected in series in the TH22 mode.

FIG. 11 is a schematic transistor diagram of the cell architecture portion 1002 including the base cell 1006 of the THx2 FPGA cell 1000 of FIG. 10. The transistor diagram of the cell architecture portion 1002 in FIG. 11 shows the connectivity of the base cell 1006. A "reset NULL" block 1012 for a two-input threshold gate is shown. When NULL values (i.e., '0's) are applied to the A and B inputs, the two PMOS transistors 308 turn "ON," and the Zb wire is pulled up to V (resulting in logic '1'), and the output Z wire is reset to NULL (i.e., '0') by a CMOS inverter 312.

Referring to FIG. 11, the base cell 1006 and a modified output network 1010B of the THx2 FPGA cell 1000 of FIG. 10 is shown including TH12 and TH22 modes. The base cell 1006 may be communicatively coupled to the modified output network 1010B, which includes one NMOS transistor and three PMOS transistors, and the memory cell 1008 of FIGS. 10 and 12. In embodiments, the memory cell 1008 is configured to transmit a signal M and a logical inverse signal Mb, and the base cell 1006 is configured to receive the signal M and the logical inverse signal Mb. Setting x in THx2 to a threshold of 1 to operate in the TH12 mode for the THx2 FPGA cell 1000 may include programming the memory cell 1008 for the FPGA such that, as shown in FIG. 11, a pair of NMOS transistors 310 in the set DATA block 1014 of the base cell 1006 are configured to receive respective inputs A, B and be connected in parallel to activate the M NMOS transistors 310M, and a value of 1 on the signal M and a value of 0 on the logical inverse signal Mb from the memory cell 1008 is configured to operate the base cell 1006 in the TH12 mode. Setting x in THx2 to the threshold of 2 to operate in the TH22 mode for the THx2 FPGA cell 1000 may include programming the memory cell 1008 for the FPGA such that the pair of NMOS transistors 310 in the base cell 1006 configured to receive respective inputs A, B are configured to be connected in series to activate the diagonal Mb NMOS transistor 310M, and a value of 0 on the signal M and a value of 1 on the logical inverse signal Mb from the memory cell is configured to operate the base cell 1006 in the TH22 mode for the FPGA.

A "set DATA" block 1014 is shown as a component of the programmable THx2 FPGA cell 1000. The mode, M, of the "set DATA" block 1014 is controlled by the value stored in the programming memory cell 1008, a transistor diagram of which is shown in FIG. 12. FIG. 12 shows a schematic transistor diagram of the memory cell portion 1004 of the memory cell 1008 of the THx2 FPGA cell 1000 of FIG. 10. The memory cell 1008 includes 5 (five) transistors built on a set of minimum sized cross-coupled inverters where the WRITE transistor Wb is a PMOS 308 instead of an NMOS transistor 310 to allow for an even number of PMOS and NMOS transistors 308, 310 in the THx2 FPGA cell 1000. Since the WRITE transistor Wb is a PMOS transistor 308, the actual WRITE signal is active low.

Referring again to FIG. 11, a value of '1' on M (which would be '0' on Mb) puts the base cell 1006 of the THx2 FPGA cell 1000 in the TH12 mode. With M='1,' both NMOS transistors 310M with M on the gates will be turned "ON" and the diagonal NMOS transistor 310M with Mb on the gate will be turned "OFF," and the NMOS transistors 310 with A and B on the gates will be in a parallel, TH12 configuration in which drain nodes are connected to Zb and source nodes are connected to G (i.e., VSS).

Alternatively, in the "set DATA" block 1014 of FIG. 11, a value of '0' on M (which would be '1' on Mb) puts the base cell 1006 of the THx2 FPGA cell 1000 in the TH22 mode. With M='0,' both NMOS transistors 310M with M on the gates will be turned "OFF" and the diagonal NMOS transistor 310M with Mb on the gate will be turned "ON," and the NMOS transistors 310 with A and B on the gates will be in a series, TH22 configuration in which a drain node on the A transistor is connected to Zb through the diagonal Mb NMOS transistor 310M.

The output network 1010B of FIG. 11 forms the output inverter and "HOLD" network for the base cell 1006. A minimal transistor circuit of the output network 1010B uses a modification of the output network 1010A of FIG. 13A, which modification is shown in FIG. 13B as the output network 1010B. The modification of the output network 1010B as used in FIG. 11 is configured to provide the overall number of 16 transistors for the programmable THx2 FPGA cell 1000 and provide an even number of PMOS 308 and NMOS transistors 310.

Figure 13A:
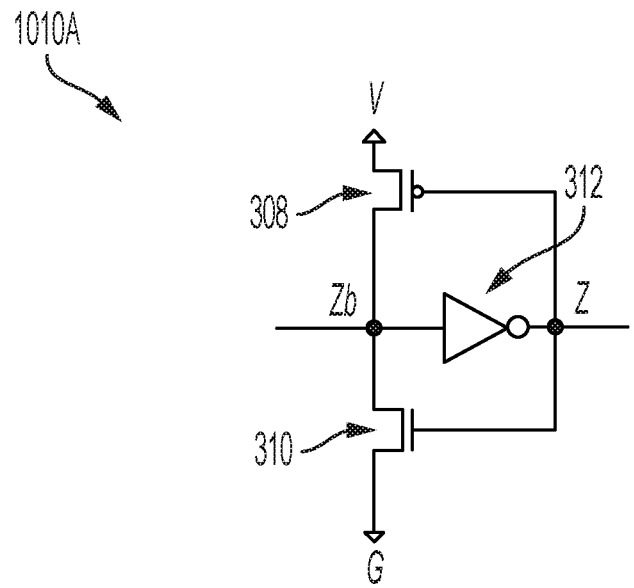
FIG. 13A is a schematic transistor diagram of an output network for the THx2 FPGA cell of FIG. 10.
Figure 13B:
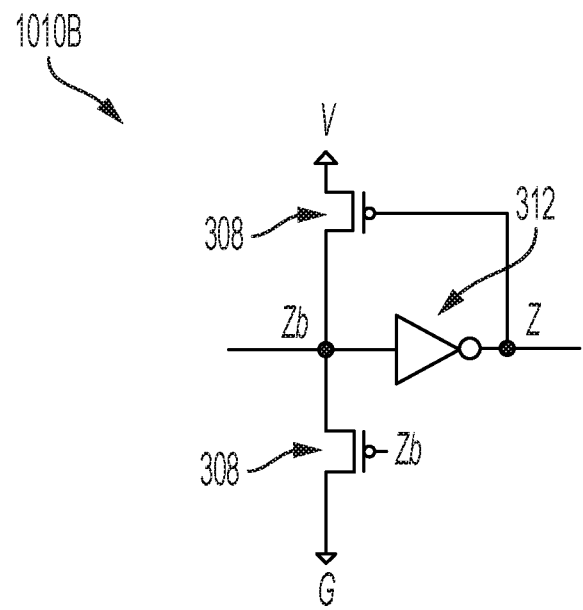
FIG. 13B is a schematic transistor diagram of a modified output network for the THx2 FPGA cell of FIG. 10.

FIGS. 13A and 13B respectively show the output network 1010A and the modified output network 1010B of output and modified output inverter and "HOLD" networks. FIG. 13A is a schematic transistor diagram of an output network 1010A for the THx2 FPGA cell 1000 of FIG. 10. FIG. 13B is a schematic transistor diagram of a modified output network 1010B for the THx2 FPGA cell 1000 of FIG. 10.

FIG. 13A shows an implementation for the output network 1010A that uses two cross-coupled inverter circuits (i.e., two PMOS transistors 308 and two NMOS transistors 310) to output and "HOLD" the value of the TH12 and TH22 modes. However, use of the output network 1010A with the base cell 1006 and memory cell 1008 would result in an uneven number of 7 (seven) PMOS transistors 308 and 9 (nine) NMOS transistors 310, 310M.

FIG. 13B shows the output network 1010B with a modified output inverter and "HOLD" circuit that uses three PMOS transistors 308 and one NMOS transistor 310. For example, the inverter 312 includes one PMOS transistor 308 and one NMOS transistor 310. The transistors in FIG. 4B when combined with the transistors 308, 310, 310M in FIG. 1 of the "reset NULL" block 1012 and the "set DATA" block 1014 and the memory cell 1008 of FIG. 12 sums to a total of 16 (sixteen) transistors separated between 8 (eight) PMOS transistors 308 and 8 (eight) NMOS transistors 310 (including NMOS transistors 310M).

The even number of PMOS and NMOS transistors 308, 310 provides an implementation configured to form a nearly square, easily array-able layout.

The output inverter and "HOLD" transistors 308, 310 in the output network 1010A of FIG. 13A form two cross-coupled inverters 312. The larger, output inverter 312 offers a strong signal for the Z output. The "HOLD" transistors 308, 310 drive the Zb signal and enable a hysteresis effect that holds the output value Z at DATA during transition of the A and B inputs from DATA back to NULL values. The widths of the transistors 308, 310 in the "HOLD" inverter (the transistors 308,310 collectively forming an inverter 312) are minimally sized so the "reset NULL" and "set DATA" networks can overwrite the value held by the "HOLD" inverter. In the output network 1010B of FIG. 13B, the NMOS transistor 310 of the "HOLD" inverter of FIG. 13A is replaced by a PMOS transistor 308.

Details of how the output network 1010B of FIG. 13B is implemented with the THx2 FPGA cell 1000 of FIG. 10, including the base cell 1006 of FIG. 11, is described herein with respect to a consideration of the four states of the THx2 FPGA cell 1000 in the TH12 (M='1') and TH22 (M='0') modes. These four states include a state of reset NULL active as State 1, set DATA active as State 2, HOLD Z=DATA ('1') active as State 3, and HOLD Z=NULL ('0') active as State 4.

In the reset NULL active state of State 1, regardless of the value on M, both A and B inputs are NULL ('0'). The two PMOS transistors 308 in the reset NULL network of "reset NULL" block 1012 are turned "ON," and the value on Zb is driven hard to a pull-up value of '1.' In FIG. 13B, with Zb='1' and Z driven to '0,' the HOLD PMOS transistor 308 with Z on the gate is "ON" and reinforces the Zb node to '1.' The PMOS transistor 308 with Zb on the gate is "OFF" with Zb='1,' and its source and drain nodes are in an open circuit configuration that does not affect Zb or Z to give the same logical results as the circuit of the output network 1010A of FIG. 13A.

In the set DATA active state of State 2, regardless of the value on M, values on A and/or B inputs set the output Z to DATA ('1') by pulling the Zb down to '0.' A combination of NMOS transistors 310 in the set DATA network of the "set DATA" block 1014 of FIG. 11 are turned "ON," and the value on Zb is driven hard to a '0.' In FIG. 13B, with Zb='0' and Z driven to '1,' the HOLD PMOS transistor 308 with Z on the gate is "OFF," and the source and drain nodes are in an open circuit configuration that does not affect Zb or Z. The PMOS transistor 308 with Zb on the gate has '0' on the gate, source, and drain nodes, which results in an "OFF" condition. The "OFF" condition has no logical effect on the Zb or Z nodes and give the same logical results as the circuit of the output network 1010A of FIG. 13A.

In the HOLD Z=DATA ('1') active state of State 3, neither the reset NULL network of the "reset NULL" block 1012 or the set DATA network of the "set DATA" block 1014 of FIG. 11 are active regardless of the value on M. With a '1' on Z, the HOLD PMOS transistor 308 with Z on its gate is "OFF," with the corresponding source and drain nodes in an open circuit configuration having no logical effect on Zb. The HOLD PMOS transistor 308 with Zb='0' on its gate will be "ON" and will provide a weak '0' to Zb, which is enough to HOLD the output to '1' since there is nothing else driving Zb. In addition, since all other paths to a source are open, there is minimal dynamic current draw.

In the HOLD Z=NULL ('0') active state of State 4, neither the reset NULL network of the "reset NULL" block 1012 or the set DATA network of the "set DATA" block 1014 of FIG. 11 are active regardless of the value on M. With a '0' on Z, the HOLD PMOS transistor 308 with Z on its gate is "ON," with corresponding source and drain nodes providing a path from Zb to VDD, and HOLD Zb is at '1.' The HOLD PMOS transistor 308 with Zb='1' will be "OFF" and will not affect the logical output Z.

Figure 14:
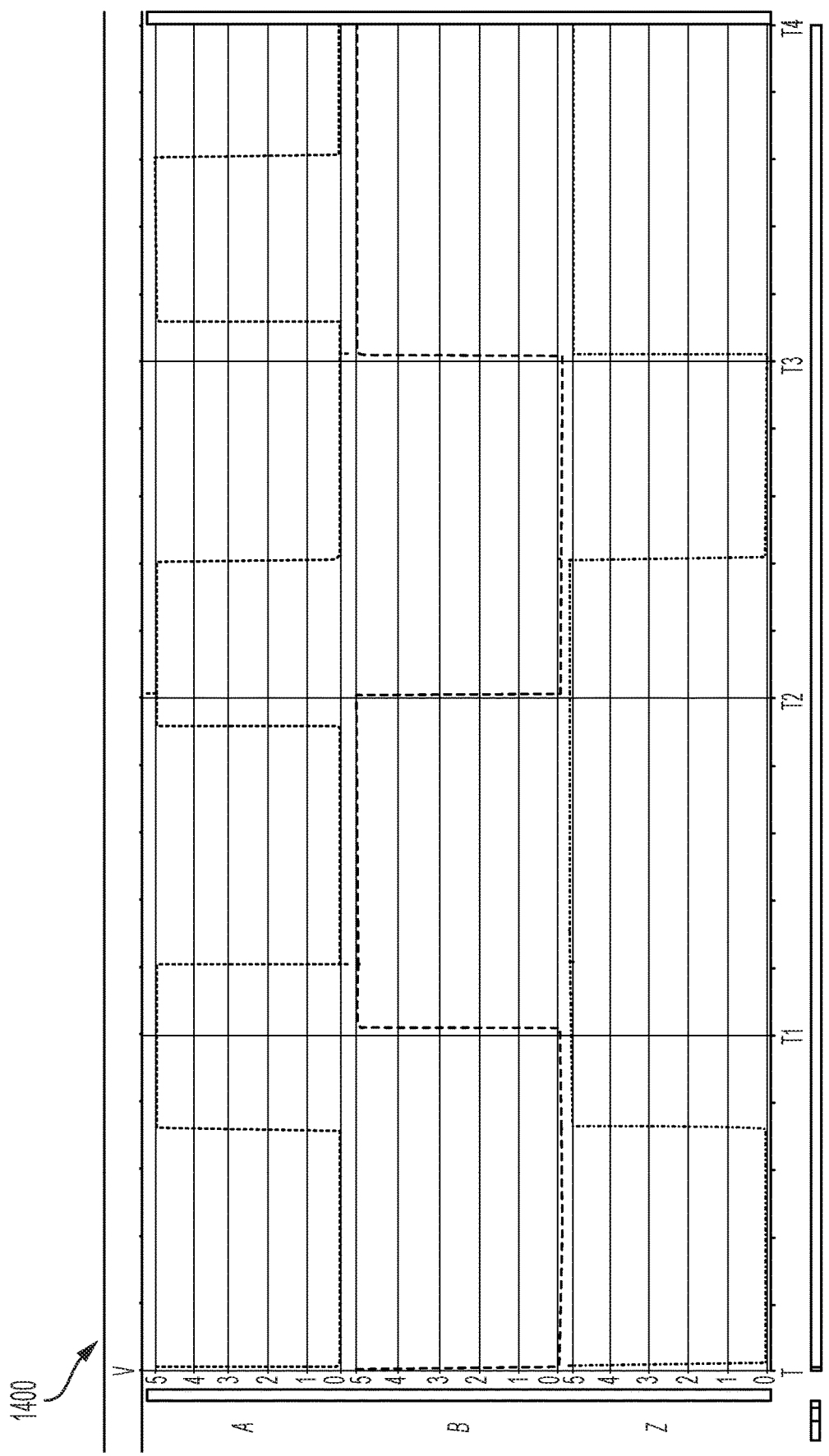
FIG. 14 is a graphical illustration of a simulation of the base cell inputs and outputs of the THx2 FPGA cell of FIG. 10 for the TH12 mode.
Figure 15:
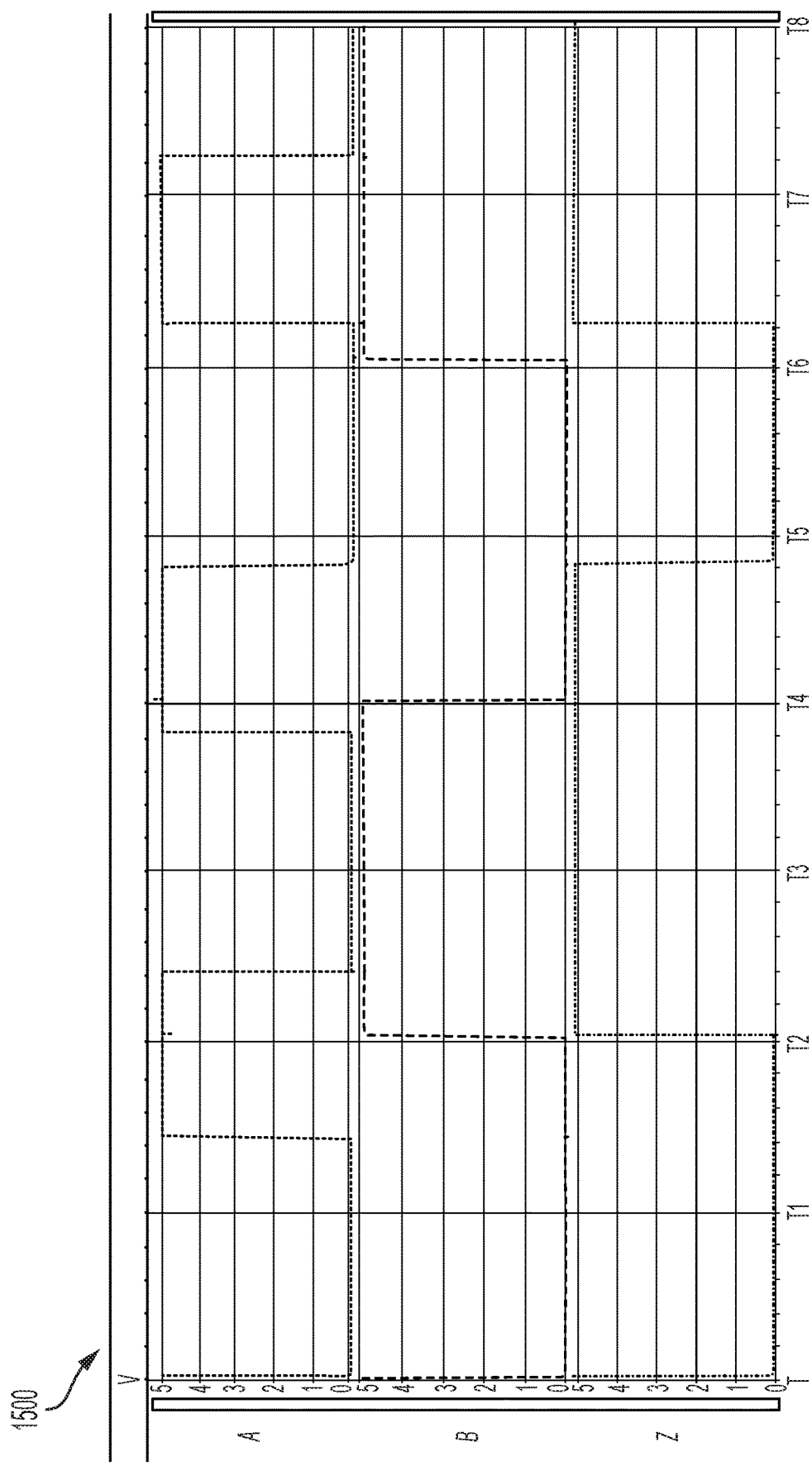
FIG. 15 is a graphical illustration of a simulation of the base cell inputs and outputs of the THx2 FPGA cell of FIG. 10 for the TH22 mode.

FIGS. 14 and 15 represent an implementation of the THx2 FPGA cell 1000 in respectively the TH12 and the TH22 modes and resulting corresponding simulation graphs extracted from the cell layout through a spice model. The simulations 1400 and 1500 in FIGS. 14 and 15 respectively show the output waveforms for the TH12 (M='1') and TH22 (M='0') modes.

FIG. 14 is a graphical illustration of the simulation 1400 of the base cell inputs and outputs of the THx2 FPGA cell 1000 of FIG. 10 for the TH12 mode. Operation of the THx2 FPGA cell 1000 is based on a size of the output inverter and HOLD network transistors determination as described herein. Further, widths of the devices in the set to DATA and reset to NULL sub-circuits of, respectively, the "reset NULL" block 1012 or the set DATA network of the "set DATA" block 1014 of FIG. 11 may be sized large enough to overpower the HOLD network transistors. Otherwise, the size can be varied to provide more delay and less area or vice versa. The simulation 1400 is representative of first writing a logic '1' to the memory cell 1008 and simulating the TH12 mode.

For the TH12 mode of FIG. 14, the inputs A and B are set to NULL ('0') to reset the output Z to NULL ('0') and all combinations of the inputs A and B set to DATA and NULL are cycled through. The output Z of the simulation 1400 verifies that with any input value A, B set to DATA, the output Z is also DATA. Further, when both inputs A, B are reset to NULL, the output Z is also reset to NULL. Thus, the TH12 mode with the form of A+B=Z for the THx2 FPGA cell 1000 of FIG. 10 is functioning as expected.

FIG. 15 is a graphical illustration of the simulation 1500 of the base cell inputs and outputs of the THx2 FPGA cell 1000 of FIG. 10 for the TH22 mode. The simulation 1500 is representative of first writing a logic '0' to the memory cell 1008 and simulating the TH22 mode. For the TH22 mode of FIG. 15, the inputs A and B are set to NULL to reset the output Z to NULL. All combinations of the inputs A, B are set to DATA and NULL. The output Z verifies that both input values A, B must be set to DATA for the output Z to be set to DATA. For the TH22 mode in FIG. 15, once the output Z is set to DATA, the output Z stays at DATA until all inputs A, B go back to NULL, which is the result of a hysteresis effect for operation of the TH22 function in the A+B=Z form of the TH22 mode for the THx2 FPGA cell 1000 of FIG. 10.

Several advantages to clockless asynchronous digital design are presented through use of the THx2 cells described herein, whether the THx2 MPGA cell 300 or THx2 FPGA cell 1000. Non-limiting examples include (1) the use of the asynchronous nature of logic switching to minimize opportunities for power, electromagnetic, temperature and other side-channel attacks and reduce digital noise for sensitive, mixed-signal ICs, (2) more efficient processing of data versus a worst case scenario for synchronous sequential circuits, and (3) elimination of a difficult clock-routing step from the IC design flow.

The THx2 cell embodiment described herein may be utilized with systems including communicatively coupled components. For example, with such emerging computing technologies, systems including one or more devices communicatively coupled to one or more processors may be configured or programmed to execute one or more machine readable instructions stored in one or more memory devices. As used herein, the term "communicatively coupled" means that coupled components are capable of exchanging data signals with one another such as, for example, electrical signals via conductive medium, electromagnetic signals via air, optical signals via optical waveguides, and the like. Modules of such systems may be configured to use a neural network that, in a field of machine learning, for example, may be a class of deep, feed-forward artificial neural networks for artificial intelligence applications. As an example, and not a limitation, artificial intelligence features of such systems may include components selected from the group consisting of an artificial intelligence engine, Bayesian inference engine, and a decision-making engine, and may have an adaptive learning engine further comprising a deep neural network learning engine. Such systems may implement computer and software-based methods and include a communication path for communicatively coupling system modules, the one or more processors (that may be may be a controller, an IC, a microchip, a computer, or any other computing device), the one or more memory devices, one or more databases, network interface hardware, a network, one or more servers, and one or more computing devices. The systems can comprise multiple application servers and workstations. In some embodiments, the systems are implemented using a local area network (LAN), a wide area network (WAN), or other network, such as an intranet or the Internet.

The systems may use the THx2 cell embodiments described herein alongside one or more alternative memory devices, such as volatile or non-volatile memory that may comprise random access memory (RAM), read only memory (ROM), flash memories, hard drives, or any device capable of storing machine-readable instructions such that the machine-readable instructions can be accessed and executed by the one or more processors. The machine-readable instructions may comprise logic or algorithm(s) written in any programming language such as, for example, machine language that may be directly executed by the one or more processors, or assembly language, object-oriented programming (OOP), scripting languages, microcode, etc., that may be compiled or assembled into machine-readable instructions and stored on the memory devices. Alternatively, the machine-readable instructions may be written in HDL, such as logic implemented via either an FPGA configuration or an ASIC configuration, or their equivalents.

Data stored and manipulated in the systems described herein is utilized by the system modules that are able to leverage the network, such as a cloud computing-based network configuration (e.g., the cloud) or other network variations, to apply machine learning and artificial intelligence. This machine learning application may create models that can be applied by the system to make it more efficient and intelligent in execution. The network can comprise any wired and/or wireless network such as, for example, local area networks, wide area networks, metropolitan area networks, the Internet, an Intranet, satellite networks, or the like. Accordingly, the network can be utilized as a wireless access point by a computing device to access one or more servers that generally comprise processors, memory, and chipset for delivering resources via the network. Resources can include providing, for example, processing, storage, software, and information from the server to the system via the network. Additionally, the server(s) can share resources with one another over the network such as, for example, via the wired portion of the network, the wireless portion of the network, or combinations thereof Aspects Listing Aspect 1. A THx2 threshold gate cell comprises a mode-independent PMOS configuration and an NMOS configuration configured to operate in one of a TH12 mode and a TH22 mode, wherein x is a threshold of 1 for the TH12 mode and x is a threshold of 2 for the TH22 mode.

Aspect 2. The THx2 threshold gate cell of Aspect 1, wherein the mode-independent PMOS configuration and the NMOS configuration are configured to form a NAND gate.

Aspect 3. The THx2 threshold gate cell of Aspect 1 or Aspect 2, further comprising a mask programmable gate array (MPGA).

Aspect 4. The THx2 threshold gate cell of Aspect 3, wherein the NMOS configuration configured to operate in one of the TH12 mode and the TH22 mode based on an additional NMOS wiring configuration to eliminate an NMOS transistor in the TH12 mode.

Aspect 5. The THx2 threshold gate cell of Aspect 4, wherein a set DATA block comprises a pair of NMOS transistors connected through the additional NMOS wiring configuration in parallel in the TH12 mode.

Aspect 6. The THx2 threshold gate cell of Aspect 4, wherein a set DATA block comprises a pair of NMOS transistors connected through the additional NMOS wiring configuration in series in the TH22 mode.

Aspect 7. The THx2 threshold gate cell of any of Aspect 1 to Aspect 4, further comprising an output network, wherein the mode-independent PMOS configuration comprises a reset NULL block comprising a pair of PMOS transistors in series, and the NMOS configuration comprises a set DATA block comprising a pair of NMOS transistors.

Aspect 8. The THx2 threshold gate cell of Aspect 7, wherein the set DATA block comprises the pair of NMOS transistors connected in parallel in the TH12 mode.

Aspect 9. The THx2 threshold gate cell of Aspect 7, wherein the set DATA block comprises the pair of NMOS transistors connected in series in the TH22 mode.

Aspect 10. The THx2 threshold gate cell of Aspect 7, wherein the output network comprises a pair of CMOS inverters.

Aspect 11. The THx2 threshold gate cell of Aspect 1 or Aspect 2, further comprising a field programmable gate array (FPGA).

Aspect 12. The THx2 threshold gate cell of any of Aspect 1, Aspect 2, or Aspect 11, wherein the mode-independent PMOS configuration comprises a set of eight PMOS transistors and the NMOS configuration comprises a set of eight NMOS transistors.

Aspect 13. The THx2 threshold gate cell of Aspect 12, further comprising an output network, wherein the output network comprises a portion of each of the mode-independent PMOS configuration and the NMOS configuration.

Aspect 14. The THx2 threshold gate cell of Aspect 13, wherein the output network comprising the portion of each of the mode-independent PMOS configuration and the NMOS configuration comprises (i) three transistors of the set of eight PMOS transistors and (ii) one transistor of the set of eight NMOS transistors.

Aspect 15. The THx2 threshold gate cell of Aspect 14, further comprising a memory cell configured to transmit a signal M and a logical inverse signal Mb, the memory cell comprising (i) three transistors of the set of eight PMOS transistors and (ii) two transistors of the set of eight NMOS transistors, and a base cell configured to receive the signal M and the logical inverse signal Mb, the base cell comprising the output network, a reset NULL block, and a set DATA block. The reset NULL block comprises two transistors of the set of eight PMOS transistors, and the set DATA block comprises five transistors of the set of eight NMOS transistors.

Aspect 16. The THx2 threshold gate cell of any of Aspect 1, Aspect 2, or any of Aspect 11 to Aspect 14, further comprising a memory cell configured to transmit a signal M and a logical inverse signal Mb and a base cell configured to receive the signal M and the logical inverse signal Mb.

Aspect 17. The THx2 threshold gate cell of Aspect 16, wherein the NMOS is configuration configured to operate in one of the TH12 mode and the TH22 mode based on an NMOS programmed configuration, and the NMOS programmed configuration is programmed such that (i) a value of 1 on the signal M and a value of 0 on the logical inverse signal Mb from the memory cell is configured to operate the base cell in the TH12 mode and (ii) a value of 0 on the signal M and a value of 1 on the logical inverse signal Mb from the memory cell is configured to operate the base cell in the TH22 mode.

Aspect 18. The THx2 threshold gate cell of Aspect 17, wherein two NMOS transistors in the base cell are configured to receive the value of 1 on the signal M such that a pair of NMOS transistors in the base cell are configured to receive respective inputs and be connected in parallel in the TH12 mode, and one NMOS transistor in the base cell is configured to receive the value of 1 on the logical inverse signal Mb such that the pair of NMOS transistors in the base cell configured to receive respective inputs are configured to be connected in series in the TH22 mode.

Aspect 19. A method of operating a THx2 threshold gate cell comprising accessing the THx2 threshold gate cell comprising a mode-independent PMOS configuration and an NMOS configuration configured to operate in one of a TH12 mode and a TH22 mode, setting x to a threshold of 1 to operate in the TH12 mode, and setting x to a threshold of 2 to operate in the TH22 mode.

Aspect 20. The method of Aspect 19, wherein the THx2 threshold gate cell is one of a mask programmable gate array (MPGA) and a field programmable gate array (FPGA), the MPGA comprising an MPGA base cell and an output network, the FPGA comprising a memory cell configured to transmit a signal M and a logical inverse signal Mb, an FPGA base cell configured to receive the signal M and the logical inverse signal Mb, and a modified output network comprise one NMOS transistor and three PMOS transistors. Setting x in THx2 to a threshold of 1 to operate in the TH12 mode comprises (1) connecting a pair of NMOS transistors in parallel in the NMOS configuration to eliminate an NMOS transistor of the NMOS configuration in the TH12 mode for the MPGA, and (2) programming the memory cell for the FPGA such that a pair of NMOS transistors in the FPGA base cell are configured to receive respective inputs and be connected in parallel and a value of 1 on the signal M and a value of 0 on the logical inverse signal Mb from the memory cell is configured to operate the FPGA base cell in the TH12 mode. Further, setting x in THx2 to a threshold of 2 to operate in the TH22 mode comprises (1) connecting the pair of NMOS transistors in in series in the NMOS configuration for the MPGA, and (2) programming the memory cell for the FPGA such that the pair of NMOS transistors in the FPGA base cell configured to receive respective inputs are configured to be connected in series and a value of 0 on the signal M and a value of 1 on the logical inverse signal Mb from the memory cell is configured to operate the FPGA base cell in the TH22 mode for the FPGA.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" and "about" are utilized herein to represent the inherent degree of uncertainty that may be attributed to any quantitative comparison, value, measurement, or other representation. The terms "substantially" and "approximately" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A THx2 threshold gate cell comprising:
   a mode-independent PMOS configuration;
   an NMOS configuration configured to operate in one of a TH12 mode and a TH22 mode, wherein x is a threshold of 1 for the TH12 mode and x is a threshold of 2 for the TH22 mode;
   a memory cell configured to transmit a signal M and a logical inverse signal Mb; and
   a base cell configured to receive the signal M and the logical inverse signal Mb, wherein:
   the NMOS is configuration configured to operate in one of the TH12 mode and the TH22 mode based on an NMOS programmed configuration;
   the NMOS programmed configuration is programmed such that (i) a value of 1 on the signal M and a value of 0 on the logical inverse signal Mb from the memory cell is configured to operate the base cell in the TH12 mode and (ii) a value of 0 on the signal M and a value of 1 on the logical inverse signal Mb from the memory cell is configured to operate the base cell in the TH22 mode;
   two NMOS transistors in the base cell are configured to receive the value of 1 on the signal M such that a pair of NMOS transistors in the base cell are configured to receive respective inputs and be connected in parallel in the TH12 mode; and
   one NMOS transistor in the base cell is configured to receive the value of 1 on the logical inverse signal Mb such that the pair of NMOS transistors in the base cell configured to receive respective inputs are configured to be connected in series in the TH22 mode.

2. The THx2 threshold gate cell of claim 1, wherein the mode-independent PMOS configuration and the NMOS configuration are configured to form a NAND gate.

3. The THx2 threshold gate cell of claim 1, further comprising a mask programmable gate array (MPGA).

4. The THx2 threshold gate cell of claim 3, wherein the NMOS configuration configured to operate in one of the TH12 mode and the TH22 mode based on an additional NMOS wiring configuration to eliminate an NMOS transistor in the TH12 mode.

5. The THx2 threshold gate cell of claim 4, wherein a set DATA block comprises a pair of NMOS transistors connected through the additional NMOS wiring configuration in parallel in the TH12 mode.

6. The THx2 threshold gate cell of claim 4, wherein a set DATA block comprises a pair of NMOS transistors connected through the additional NMOS wiring configuration in series in the TH22 mode.

7. The THx2 threshold gate cell of claim 1, further comprising an output network, wherein:
   the mode-independent PMOS configuration comprises a reset NULL block comprising a pair of PMOS transistors in series; and
   the NMOS configuration comprises a set DATA block comprising a pair of NMOS transistors.

8. The THx2 threshold gate cell of claim 7, wherein the set DATA block comprises the pair of NMOS transistors connected in parallel in the TH12 mode.

9. The THx2 threshold gate cell of claim 7, wherein the set DATA block comprises the pair of NMOS transistors connected in series in the TH22 mode.

10. The THx2 threshold gate cell of claim 7, wherein the output network comprises a pair of CMOS inverters.

11. The THx2 threshold gate cell of claim 1, further comprising a field programmable gate array (FPGA).

12. The THx2 threshold gate cell of claim 1, wherein:
    the mode-independent PMOS configuration comprises a set of eight PMOS transistors; and
    the NMOS configuration comprises a set of eight NMOS transistors.

13. The THx2 threshold gate cell of claim 12, further comprising an output network, wherein the output network comprises a portion of each of the mode-independent PMOS configuration and the NMOS configuration.

14. The THx2 threshold gate cell of claim 13, wherein the output network comprising the portion of each of the mode-independent PMOS configuration and the NMOS configuration comprises (i) three transistors of the set of eight PMOS transistors and (ii) one transistor of the set of eight NMOS transistors.

15. The THx2 threshold gate cell of claim 14, further comprising:

the memory cell comprising (i) three transistors of the set of eight PMOS transistors and (ii) two transistors of the set of eight NMOS transistors; and the base cell comprising the output network, a reset NULL block, and a set DATA block;

wherein the reset NULL block comprises two transistors of the set of eight PMOS transistors; and wherein the set DATA block comprises five transistors of the set of eight NMOS transistors.

16. A method of operating a THx2 threshold gate cell comprising:

accessing the THx2 threshold gate cell comprising a mode-independent PMOS configuration and an NMOS configuration configured to operate in one of a TH12 mode and a TH22 mode;

setting x to a threshold of 1 to operate in the TH12 mode; and setting x to a threshold of 2 to operate in the TH22 mode, wherein:

the THx2 threshold gate cell is one of a mask programmable gate array (MPGA) and a field programmable gate array (FPGA), the MPGA comprising an MPGA base cell and an output network, the FPGA comprising a memory cell configured to transmit a signal M and a logical inverse signal Mb, an FPGA base cell configured to receive the signal M and the logical inverse signal Mb, and a modified output network comprise one NMOS transistor and three PMOS transistors;

setting x in THx2 to a threshold of 1 to operate in the TH12 mode comprises (1) connecting a pair of NMOS transistors in parallel in the NMOS configuration to eliminate an NMOS transistor of the NMOS configuration in the TH12 mode for the MPGA, and (2) programming the memory cell for the FPGA such that a pair of NMOS transistors in the FPGA base cell are configured to receive respective inputs and be connected in parallel and a value of 1 on the signal M and a value of 0 on the logical inverse signal Mb from the memory cell is configured to operate the FPGA base cell in the TH12 mode; and setting x in THx2 to a threshold of 2 to operate in the TH22 mode comprises (1) connecting the pair of NMOS transistors in in series in the NMOS configuration for the MPGA, and (2) programming the memory cell for the FPGA such that the pair of NMOS transistors in the FPGA base cell configured to receive respective inputs are configured to be connected in series and a value of 0 on the signal M and a value of 1 on the logical inverse signal Mb from the memory cell is configured to operate the FPGA base cell in the TH22 mode for the FPGA.

* * * * *